US012405553B2

(12) United States Patent
Nogami et al.

(10) Patent No.: US 12,405,553 B2
(45) Date of Patent: Sep. 2, 2025

(54) IMAGE FORMING SYSTEM HAVING DEVELOPER CONTAINER, ROTATING MEMBER FOR ROTATING SHUTTER, AND RESTRICTION MECHANISM FOR ROTATING MEMBER

(71) Applicant: CANON KABUSHIKI KAISHA, Tokyo (JP)

(72) Inventors: Kazuaki Nogami, Saitama (JP); Takeo Kawanami, Kanagawa (JP); Akinori Mitsumata, Tokyo (JP); Hiroyuki Munetsugu, Kanagawa (JP); Goshi Ozaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/442,289

(22) Filed: Feb. 15, 2024

(65) Prior Publication Data

US 2024/0184230 A1 Jun. 6, 2024

Related U.S. Application Data

(63) Continuation of application No. 17/979,815, filed on Nov. 3, 2022, now Pat. No. 12,038,700, which is a
(Continued)

(30) Foreign Application Priority Data

Dec. 28, 2020 (JP) ................................ 2020-218436

(51) Int. Cl.
*G03G 15/08* (2006.01)

(52) U.S. Cl.
CPC ..... *G03G 15/0886* (2013.01); *G03G 15/0867* (2013.01); *G03G 15/0874* (2013.01);
(Continued)

(58) Field of Classification Search
CPC .......... G03G 15/0886; G03G 15/0874; G03G 15/0867; G03G 2215/066;
(Continued)

(56) References Cited

U.S. PATENT DOCUMENTS 5,848,338 A 12/1998 Okada
6,269,234 B1 7/2001 Kurz et al.
(Continued)

FOREIGN PATENT DOCUMENTS

EP 0 854 394 A2 7/1998
JP H10-260570 A 9/1998
(Continued)

OTHER PUBLICATIONS

European Search Report dated May 11, 2022, in related European Patent Application No. 21217826.3.
(Continued)

*Primary Examiner* — Robert B Beatty
(74) *Attorney, Agent, or Firm* — VENABLE LLP

(57) ABSTRACT

An attached portion of an image forming apparatus includes a rotating member of which at least a part is exposed outside the image forming apparatus when the developer container is attached, and a rotation restricting mechanism that is movable between a restricting position to restrict rotation of the rotating member and an allowable position to allow rotation of the rotating member, and includes a restricting member that is at the restricting position when the developer container is not attached. The developer container is attached to the attached portion so that the discharging portion engaging portion and the shutter engaging portions are engaged with the frame engaged portions and the rotating member engaged portions respectively when the container shutter is in the close state, and the restricting member moves from the restricting position to the allowable position
(Continued)

when the developer container is attached to the attached portion.

9 Claims, 31 Drawing Sheets

Related U.S. Application Data continuation of application No. 17/558,762, filed on Dec. 22, 2021, now Pat. No. 11,526,099.

(52) U.S. Cl.
CPC .............. *G03G 2215/0663* (2013.01); *G03G 2215/0673* (2013.01); *G03G 2215/0692* (2013.01)

(58) Field of Classification Search
CPC ... G03G 2215/0663; G03G 2215/0682; G03G 2215/0692; G03G 2215/0673; G03G 2215/0675; G03G 2215/0678; B41J 2/17503; B41J 2/17516; B65D 47/046; B65D 47/261; B65D 47/265
USPC ........... 399/258, 262; 222/168, 171, DIG. 1; 347/86
See application file for complete search history.

(56) References Cited

U.S. PATENT DOCUMENTS

| | | | |
|---|---|---|---|
| 6,363,235 | B1 | 3/2002 | Chiesa et al. |
| 10,488,810 | B2 | 11/2019 | Kawanami |
| 10,915,060 | B2 | 2/2021 | Kawai et al. |
| 11,066,214 | B2 | 7/2021 | Nakamura |
| 2020/0233337 | A1 | 7/2020 | Yoshida |
| 2021/0247706 | A1 | 8/2021 | Mitsumata et al. |

FOREIGN PATENT DOCUMENTS

| | | | |
|---|---|---|---|
| JP | 2001249594 | A | 9/2001 |
| JP | 2004-133191 | A | 4/2004 |
| JP | 2020-154300 | A | 9/2020 |
| JP | 2020-158911 | A | 10/2020 |
| WO | 2020/045764 | A1 | 3/2020 |

OTHER PUBLICATIONS

Japanese Office Action issued Jul. 30, 2024 in related Japanese Application No. 2020-218436.

IMAGE FORMING SYSTEM HAVING DEVELOPER CONTAINER, ROTATING MEMBER FOR ROTATING SHUTTER, AND RESTRICTION MECHANISM FOR ROTATING MEMBER

This application is a continuation of application Ser. No. 17/979,815, filed Nov. 3, 2022, which is a continuation of application Ser. No. 17/558,762, filed Dec. 22, 2021, now U.S. Pat. No. 11,526,099, issued Dec. 13, 2022.

BACKGROUND OF THE INVENTION

Field of the Invention

The present invention relates to an image forming apparatus that forms an image on a recording material.

Description of the Related Art

In an image electrophotographic type image forming apparatus, a configuration to replenish developer using a developer container, that is detachable from the image forming apparatus, is known. Japanese Patent Application Publication No. 2020-154300 discloses a configuration to open/close a shutter of a developer container for sealing an opening of the container attached to the image forming apparatus, by rotating the developer container.

SUMMARY OF THE INVENTION

In a configuration where developer is replenished to an image forming apparatus using a developer container which is detachable from the image forming apparatus, it is an object of the present invention to provide a technique to improve operability of attaching the developer container to the image forming apparatus main body.

To achieve this object, an image forming system of the present invention includes:

a developer container; and an image forming apparatus including an attached portion to which the developer container is attached, wherein the developer container further comprises:

a container portion that contains developer;

a discharging portion in which a container opening through which the developer contained in the container portion is discharged to an outside of the developer container is provided, and which includes a discharging portion engaging portion; and a container shutter that is rotatable with respect to the discharging portion about a rotation axial line, between an open position in which the container shutter opens the container opening and a close position in which the container shutter closes the container opening, and that includes a shutter engaging portion;

the attached portion further comprises:

a frame in which a receiving port through which the frame receives the developer discharged from the container opening is provided, wherein the frame includes a frame engaged portion configured to engage with the discharging portion engaging portion so as to restrict a rotation of the discharging portion about the rotation axial line;

a rotating member which is rotatable about the rotation axial line with respect to the frame and of which at least a part is exposed outside the image forming apparatus in a case where the developer container is attached to the attached portion, wherein the rotating member is provided outside the container shutter in a radius direction of a virtual circle centering the rotation axial line when viewed in a direction of the rotation axial line in a case where the developer container is attached to the attached portion, and the rotating member includes a rotating member engaged portion that engages with the shutter engaging portion, and a restricted portion, and the rotating member is configured to rotate together with the container shutter by the rotating member engaged portion being engaged with the shutter engaging portion; and a rotation restricting mechanism that includes a restricting member having a restricting portion and movable between a restricting position in which the restricting portion restricts a rotation of the rotating member by engaging with the restricted portion of the rotating member and an allowable position in which the restricting portion allows the rotating member to rotate, and a restricting member is in the restricting position in a case where the developer container is not attached to the attached portion; wherein the developer container is attached to the attached portion in a state where the container shutter is at the close position so that the discharging portion engaging portion is engaged with the frame engaged portion and so that the shutter engaging portion is engaged with the rotating member engaged portion, wherein the restricting member is configured to move from the restricting position to the allowable position by an attachment of the developer container to the attached portion.

According to the present invention, operability of attaching the developer container to the image forming apparatus main body can be improved.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

General Configuration of Image Forming Apparatus

A general configuration of an image forming apparatus 1 according to an embodiment of the present invention will be described. The image forming apparatus 1 in of the present embodiment is a monochrome laser beam printer using an electrophotographic process, and forms an image on a recording material P using developer (toner), in accordance with image information sent from such an external device as a personal computer. Examples of the recording material P are: recording paper, label paper, OHP sheets and cloth.

In the following description, the height direction of the image forming apparatus 1, in a case where the image forming apparatus 1 is provided on a horizontal surface (upward vertical direction) is assumed to be the Z direction, and a direction that intersects with the Z direction and is parallel with the rotation axial line direction (main scanning direction) of a photosensitive drum 11 (described later) is assumed to be the X direction. A direction that intersects with the X direction and the Z direction is assumed to be the Y direction. The X direction, the Y direction and the Z direction preferably intersect so as to be orthogonal to each other. For convenience, the plus side of the X direction is called the "right side", the minus side thereof is called the "left side", the plus side of the Y direction is called the "front side" or "front surface side", the minus side thereof is called the "rear side" or "rear surface side", and the plus side of the Z direction is called the "upper side" and the minus side thereof is called the "lower side".

Figure 1:
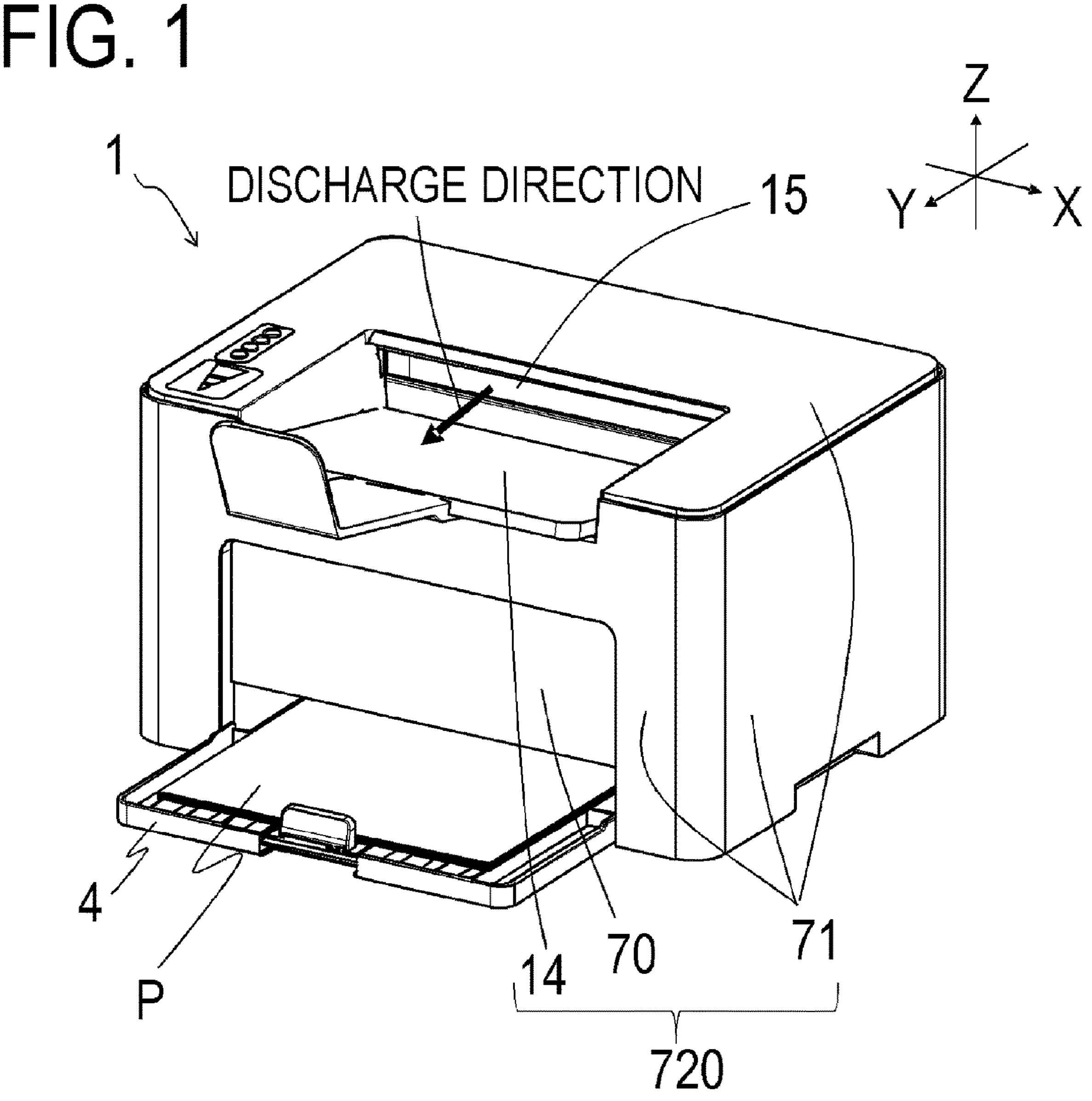
FIG. 1 is a perspective view of an image forming apparatus.
Figure 2:
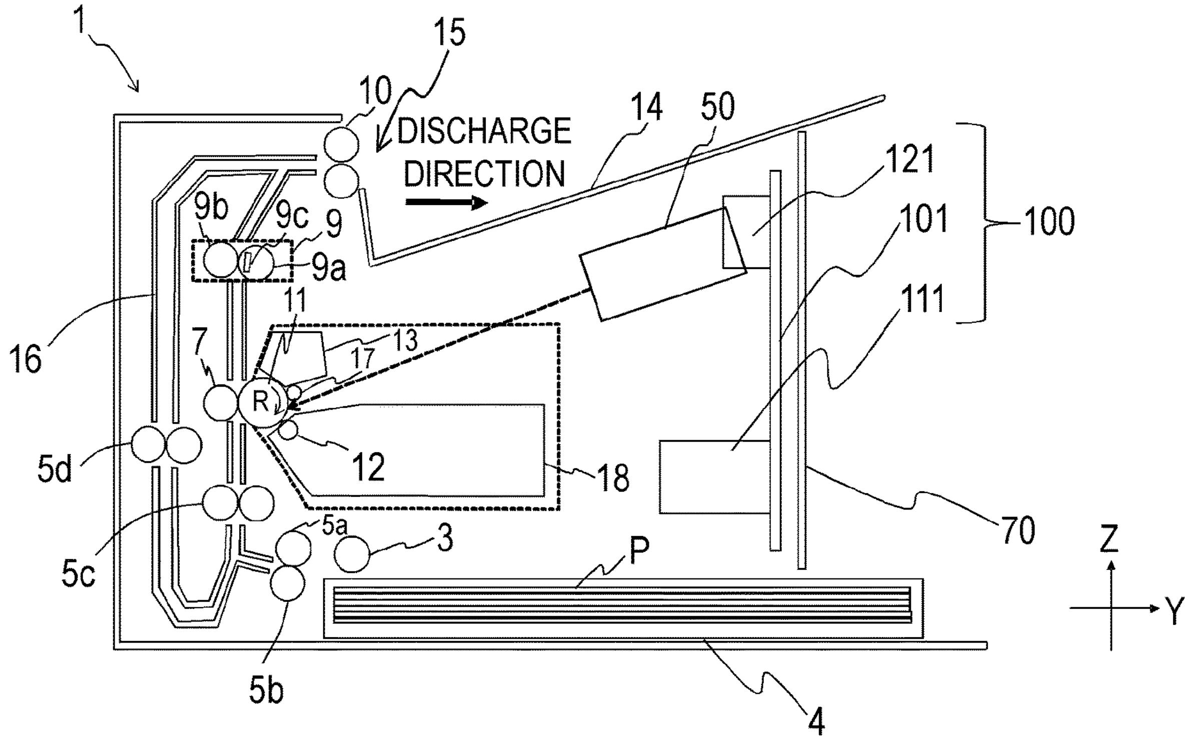
FIG. 2 is a diagram for describing an internal configuration of the image forming apparatus.

FIG. 1 is a perspective view of the image forming apparatus 1, and FIG. 2 is a diagram for describing an internal configuration of the image forming apparatus 1 viewed in the X direction (rotation axial line direction of the photosensitive drum 11). In FIG. 2, only the members related to the image forming process are selectively illustrated. In FIG. 1, the image forming apparatus 1 includes a feeding cassette 4 in which the recording material P is stored, and a discharge tray 14 on which the discharged recording material P is loaded. The feeding cassette 4 can be pulled out in the Y direction so that the user can replenish the recording material P. An image is formed on the recording material P, which was fed from the feeding cassette 4, and the recording material P is discharged from a discharge port 15 in the discharge direction (Y direction), as indicated in FIG. 1, and is loaded on the discharge tray 14. A front cover 70 is provided on a part of the end surface (a part of the front surface) of the image forming apparatus 1 on the downstream side in the discharge direction, so as to cover a later mentioned circuit board 100. An exterior cover 71 is provided on the front surface (on a part other than the area where the front cover 70 is provided), and on a side surface and a top surface of the image forming apparatus 1. The front cover 70, the exterior cover 71 and the above mentioned discharge tray 14 constitute a housing 720 of the image forming apparatus 1. The housing 720 is a member that covers the entire image forming apparatus 1, and includes the later mentioned scanner unit 50 and other process members. The above mentioned discharge outlet 15 is an opening that is formed in a part of the housing 720, and the recording material P is discharged out of the image forming apparatus 1 via the discharge port 15.

A flow of the image forming operation performed on the recording material P will be described with reference to FIG. 2. When image information is sent to the image forming apparatus 1, the photosensitive drum 11 is rotary-driven in an arrow R direction at a predetermined peripheral velocity (process speed). The scanner unit 50 emits a laser beam onto the photosensitive drum 11 based on the inputted image information. The scanner unit 50 is a unit configured of: a laser oscillator that outputs the laser beam; a polygon mirror and lenses through which the laser beam is emitted onto the photosensitive drum 11; a scanner motor to rotate the polygon mirror; and a frame that integrally supports these members. The photosensitive drum 11 is charged in advance by a charging roller 17, and an electrostatic latent image is formed on the photosensitive drum 11 (image bearing member) by the irradiation of the laser beam. Then toner (developer) contained in a container portion 18 is carried to the photosensitive drum 11 (photosensitive member) by a developing roller 12 (developer bearing member), whereby the electrostatic latent image is developed, and a toner image (developer image) is formed on the photosensitive drum 11. To the container portion 18, a later mentioned attached portion 200 for forming a replenishing port, to replenish toner from the outside, is connected.

In parallel with the above mentioned image forming process, the recording material P is fed from the feeding cassette 4. On the conveying path of the image forming apparatus 1, a pickup roller 3, a feeding roller 5*a*, and a conveying roller pair 5*c* are provided. The pickup roller 3 contacts with the topmost recording material P out of the recording materials P loaded in the feeding cassette 4, and feeds the recording material P by the rotation of the roller. The feeding roller 5*a* and a separation roller 5*b*, that press-contacts thereto, form a separation nip. In a case where a plurality of recording materials P are fed to the separation nip due to the influence of friction force between the recording materials P, the feeding roller 5*a* and the separation roller 5*b* separate the plurality of recording materials P so that only the topmost recording material P is fed to the downstream side.

The recording material P fed from the feeding cassette 4 is conveyed toward a transfer roller 7 via the conveying roller pair 5*c*. By the transfer bias applied to the transfer roller 7, the toner image, formed on the photosensitive drum 11, is transferred to the recording material P. The recording material P, on which the toner image was transferred by the transfer roller 7, is heated and pressed by a fixing apparatus 9, whereby the toner image is fixed to the recording material P. The fixing apparatus 9 is constituted of a heat roller 9*a* which includes a fixing heater 9*c*, and a pressure roller 9*b* which is biased toward the heat roller 9*a*. Then the recording material P, on which the toner image was fixed, is discharged to the discharge tray 14 via a discharge roller pair 10. In the case of forming an image on both sides of the recording material P, the discharge roller pair 10 switches back (changes the conveying direction of) the recording material P (on which first surface an image was formed), so as to guide the recording material P to a double-sided conveying path 16. The recording material P, guided to the double-sided conveying path 16, is conveyed toward the transfer roller 7 again via a double-sided conveying roller pair 5*d*. After an image is formed on the second surface of the recording material P by the transfer roller 7, the recording material P is discharged to the outside via the discharge roller pair 10. The toner, which remains on the photosensitive drum 11 after the toner image is transferred to the recording material P, is cleaned by a cleaning unit 13.

As illustrated in FIG. 2, the image forming apparatus 1 includes the circuit board 100. The circuit board 100 is constituted of a wiring board 101 formed by insulating material, and electronic components 111 and 121 which are soldered to the wiring board 101. The electronic components 111 and 121 are electrically connected since conductor wires are formed on and inside the board of the wiring board 101. The circuit board 100 has a function to convert AC current supplied from outside the image forming apparatus 1 into DC current, and to convert input voltage so as to acquire a predetermined voltage value required for the image forming process. As illustrated in FIG. 2, the circuit board 100 is provided so that the surface of the wiring board 101, on which the electronic components 111 and 121 are mounted, intersects with the discharge direction. Further, the wiring board 101 is provided between the front cover 70 and the scanner unit 50 in the discharge direction. The electronic components 111 and 121 are provided on the wiring board 101 on the side facing the scanner unit 50.

Disposition of Circuit Board

Figure 3:
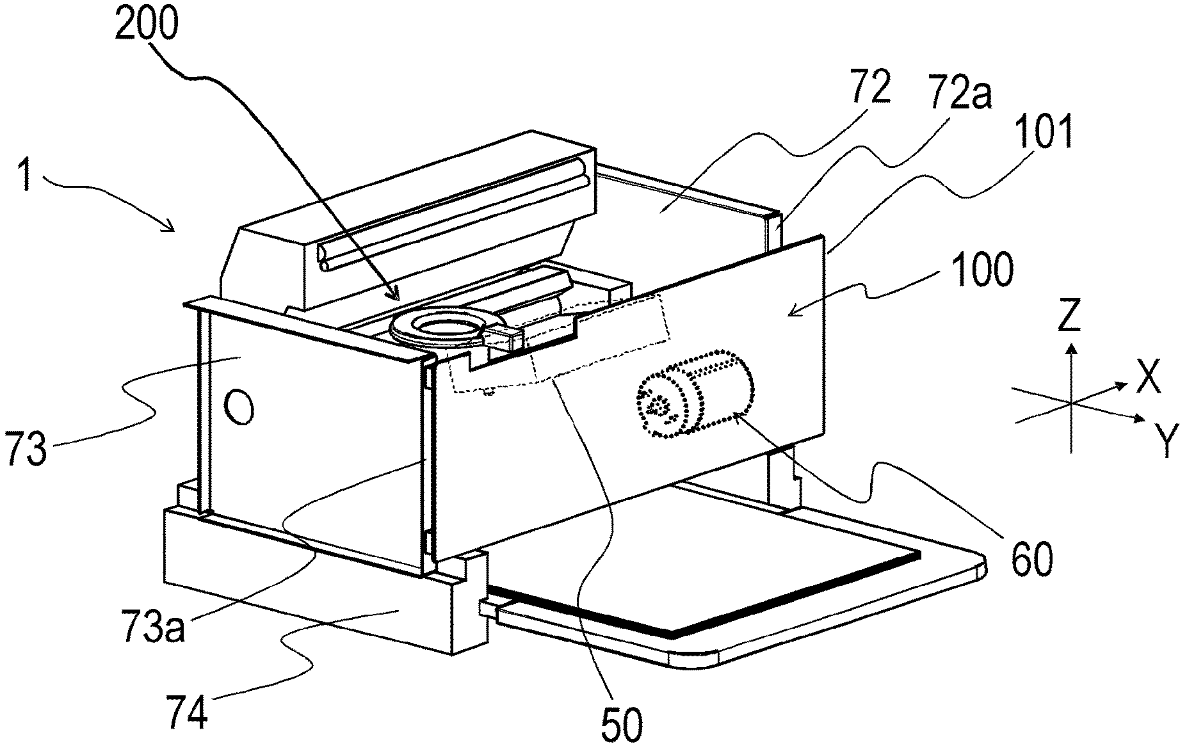
FIG. 3 is a perspective view for describing a disposition of a circuit board.

A disposition of the circuit board 100 according to the present embodiment will be described in detail with reference to FIGS. 3 to 8. FIG. 3 is a perspective view of the image forming apparatus 1 for describing a disposition of the circuit board 100, and unlike FIG. 1, illustration of the front cover 70 and the exterior cover 71 are omitted. In FIG. 3, an attached portion 200 to replenish the toner is illustrated anew. In the image forming apparatus 1 of the present embodiment, the user or service personnel can replenish developer via the attached portion 200, and the attached portion 200 is connected to the container portion 18 inside the image forming apparatus 1. The attached portion 200 will be described in detail later.

As illustrated in FIG. 3, the circuit board 100 is provided on the front surface side, and the scanner unit 50 and a drive motor 60 (drive source) are provided on the rear side (minus side of the Y direction) of the circuit board 100. In FIG. 3, the scanner unit 50 and the drive motor 60 are at positions which cannot be seen, hence are indicated by dotted lines. As illustrated in FIG. 3, the image forming apparatus 1 includes a right side plate frame 72, a left side plate frame 73, and a base frame 74. The circuit board 100 is supported by these frame members, and is equipped in the image forming apparatus 1 so that the board surface of the circuit board 100 is approximately parallel with the XZ plane. In each side edge portion of the right side plate frame 72 and the left side plate frame 73, bent portions 72*a* and 73*a* are formed respectively. The bent portion 72*a* is bent toward the plus side of the X direction so as to be approximately parallel with the XZ plane, and the bent portion 73*a* is bent toward the minus side of the X direction so as to be approximately parallel with the XZ plane. By bending both of the side plate frames toward the outside of the image forming apparatus 1 in this way, electronic components can be mounted on a larger region of the wiring board 101.

Figure 4:
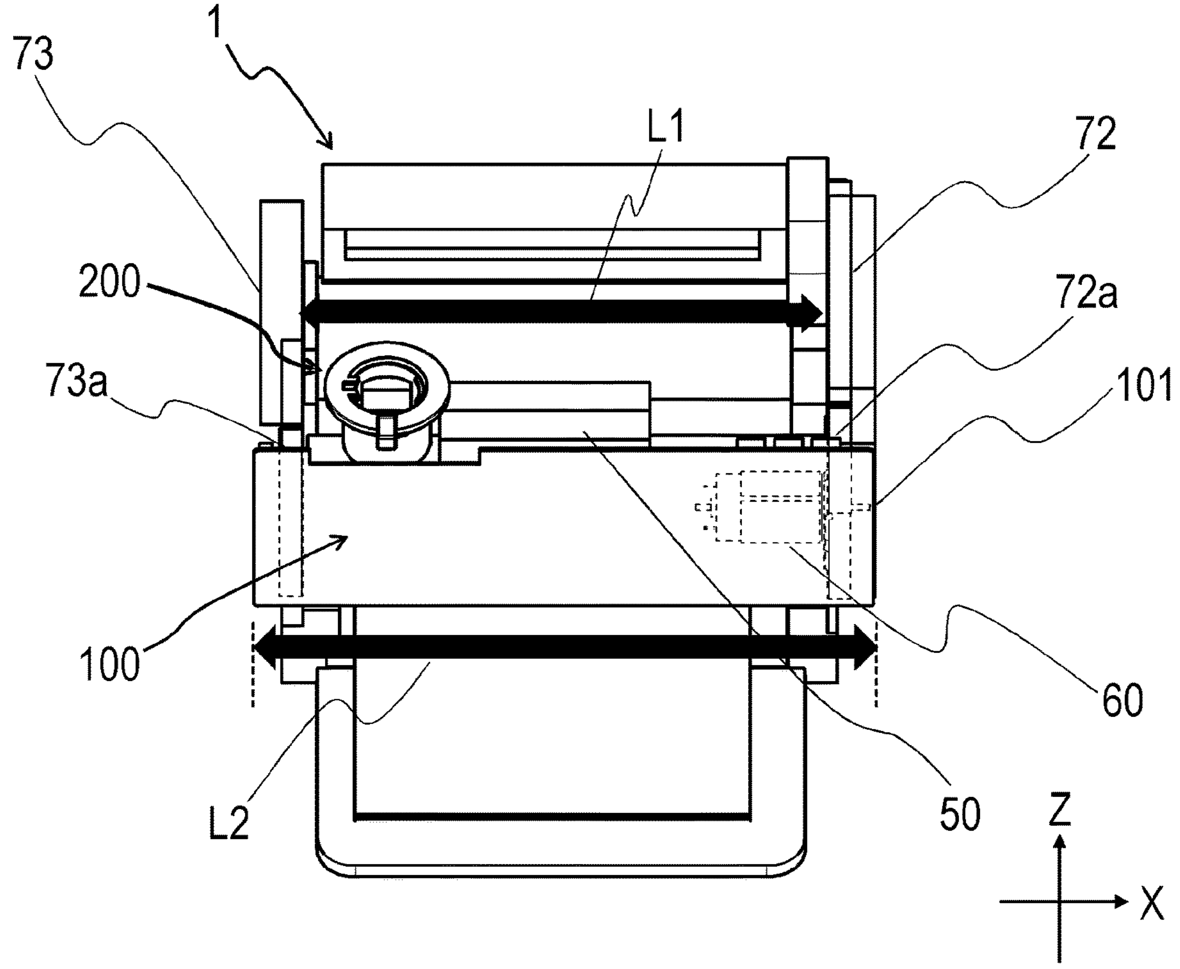
FIG. 4 is a front perspective view for describing a disposition of the circuit board.

FIG. 4 is a front perspective view of the image forming apparatus 1 for describing a disposition of the circuit board 100. As illustrated in FIG. 4, a distance L1 between an inner surface of the right side plate frame 72 and that of the left side plate frame 73 in the X direction is shorter than a length L2 of the circuit board 100 in the X direction. The wiring board 101 is provided on the plus side (front surface side) of the bent portions 72*a* and 73*a* in the Y direction. The circuit board 100 and the bent portions 72*a* and 73*a* overlap in the front view. In FIG. 4, the bent portions 72*a* and 73*a*, the scanner unit 50 and a part of the drive motor 60 are at positions which cannot be seen, hence are indicated by dotted lines.

As described above, the circuit board 100 is provided on the front surface side, and is formed throughout the area from the right side plate frame 72 to the left side plate frame 73, hence in the image forming apparatus 1, there is no need to provide bundle wire, or the like, that crosses between the right side plate frame 72 and the left side plate frame 73 in the X direction. Thereby the bundle wire length can be shorter than prior arts, and cost can be reduced accordingly. Further, the region where the bundle wire is routed is also less than prior arts, which means that electric noise can be reduced as well.

Positional Relationship Between Electronic Components and Scanner Unit

Figure 5:
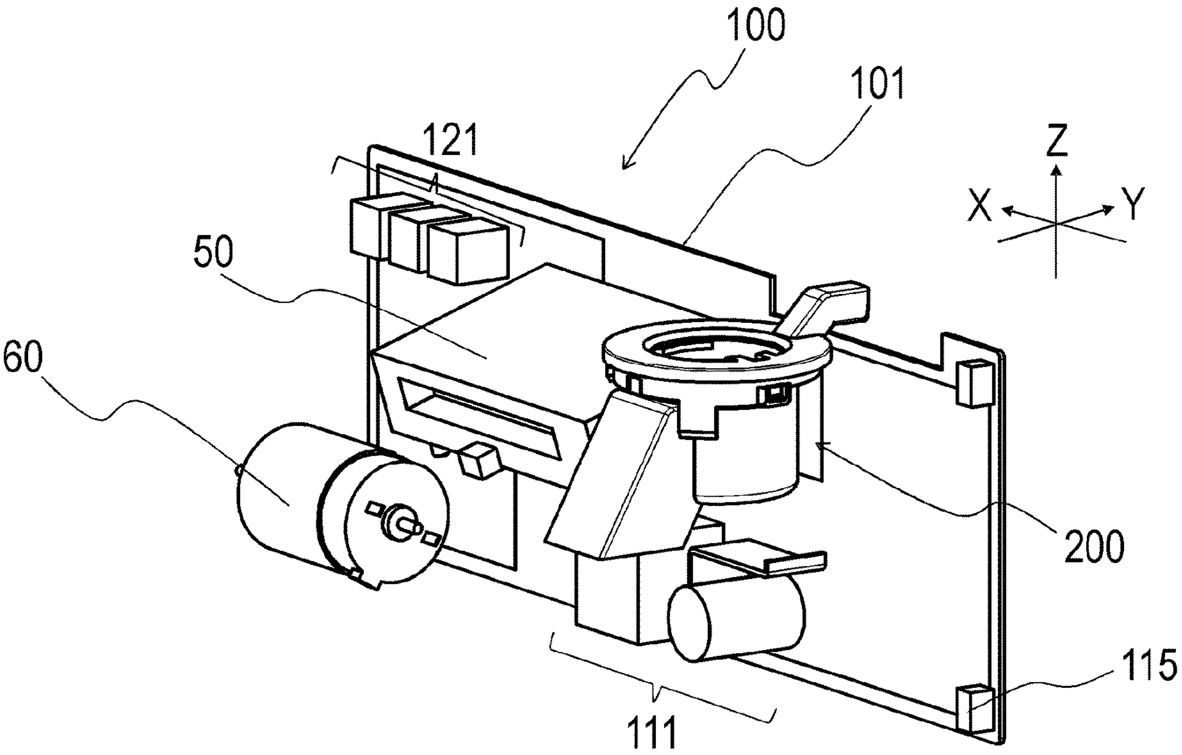
FIG. 5 is a perspective view of the circuit board and peripheral members thereof.

A positional relationship between the electronic components 111 and a scanner unit 50 will be described in detail with reference to FIGS. 5 to 7. FIG. 5 is a perspective view of the circuit board 100 viewed from the rear side of the main body. The electronic components 111, of which sizes in the Y direction are larger than the other members, are located at the lower part of the wiring board 101, and are mounted so as to be contained below the scanner unit 50, so as to utilize the space efficiently. A power supply input portion 115 is provided at the edge of the wiring board 101. The power supply input portion 115 is connected to a later mentioned inlet 116, so that power is supplied from a commercial power supply.

Figure 6:
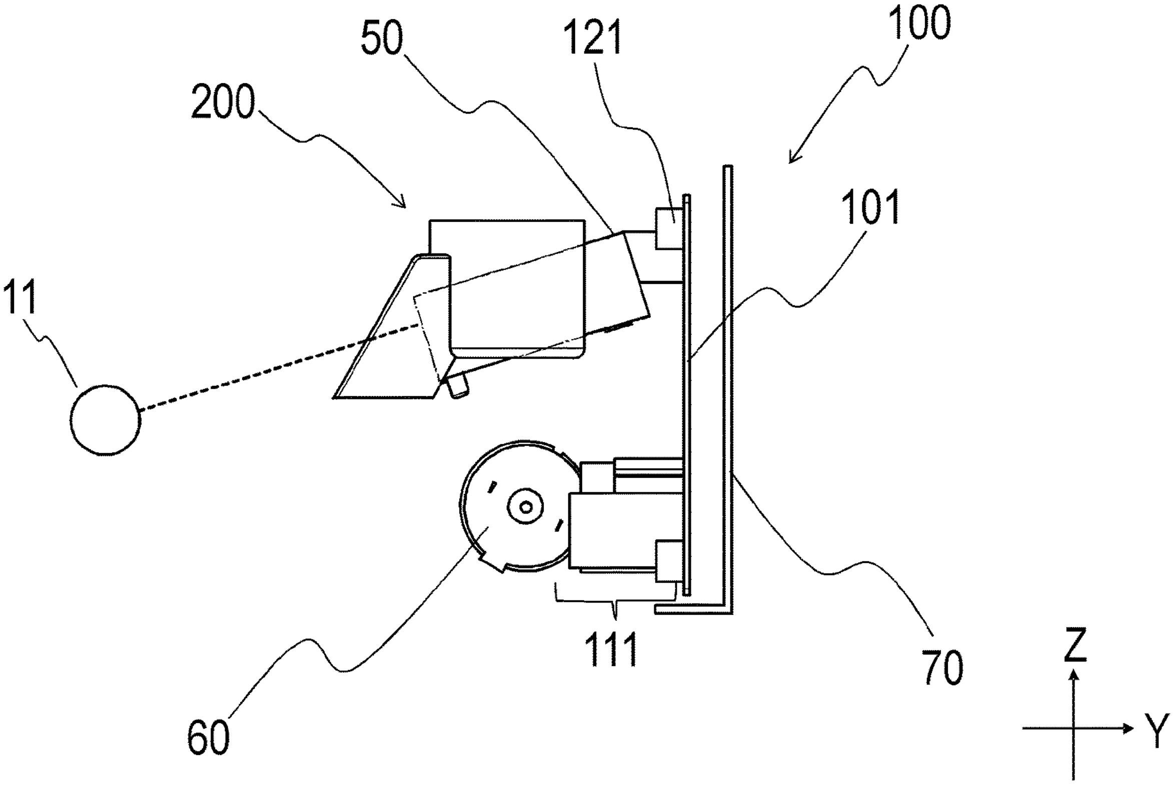
FIG. 6 is a side view of the circuit board and peripheral members thereof.

FIG. 6 is a diagram depicting the circuit board 100 viewed from the left side surface of the main body. A part of the scanner unit 50 is at a position overlapping with the attached portion 200, and cannot be seen, hence is indicated by a dashed line. The scanner unit 50 is provided at an optimum position to emit a laser beam, indicated by a dotted line, to the photosensitive drum 11. In an area where the scanner unit 50 and the wiring board 101 are closest to each other in the Y direction, no members which protrude significantly from the board surface, such as the electronic components 111, are provided. In other words, the scanner unit 50 and the electronic components 111 are provided shifted from each other in the Z direction, so as not to interfere with each other.

Figure 7:
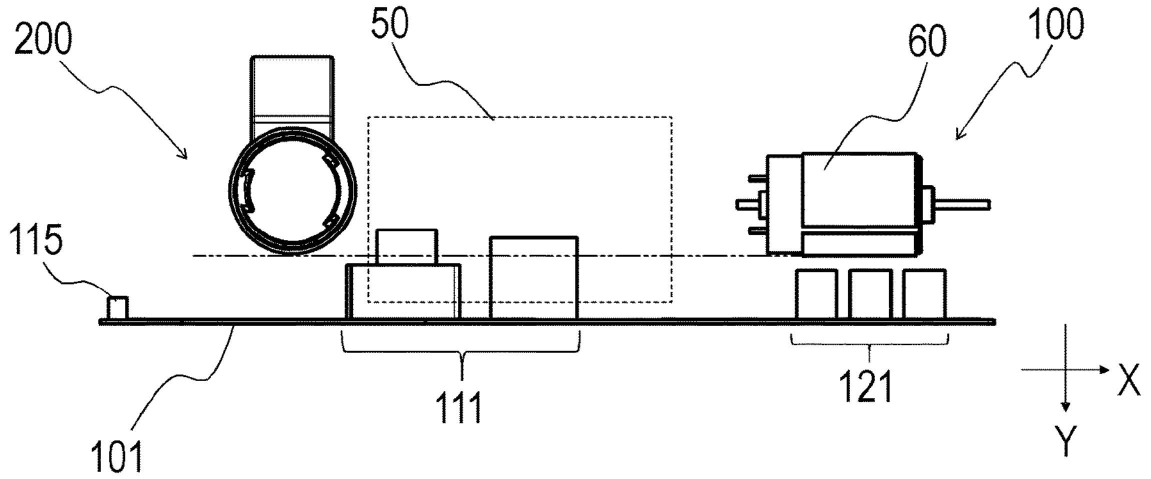
FIG. 7 is a top view of the circuit board and peripheral members thereof.

FIG. 7 is an enlarged top view when the circuit board 100 is viewed from the top surface of the main body. As illustrated in FIG. 7, the scanner unit 50 and the electronic components 111 are provided at positions that partially overlap with each other. The scanner unit 50 is on the upper side of the electronic components 111, as mentioned above, which means that the electronic components 111 cannot be seen in this direction. Therefor in FIG. 7, in order to clearly indicate the positional relationship of these two members, the scanner unit 50 is indicated by a dotted line, as if the electronic components 111 were transparent. By disposing the electronic components 111 in this position, the distance between the circuit board 100 and the scanner unit 50 in the Y direction (front—back direction) can be shortened, and the image forming apparatus 1 can be downsized.

Positional Relationship Between Electronic Component and Drive Motor

A positional relationship between the electronic components 111 and the drive motor 60 will be described in detail with reference to FIGS. 5 to 7. The drive motor 60 has a function to rotate the conveying members (e.g. pickup roller 3, feeding roller 5*a*, conveying roller pair 5*c*) and the photosensitive drum 11, to feed and convey the recording material P.

As illustrated in FIG. 5, the drive motor 60 projects to the minus side of the X direction, and the wiring board 101 is provided on the front side of the main body with respect to the drive motor 60. The electronic components 111 are mounted distant from the drive motor 60, so as not to interfere with the drive motor 60. As illustrated in FIG. 6, the drive motor 60 and the electronic components 111 are provided at positions that partially overlap with each other when viewed from the left side surface of the main body. Further, as illustrated in FIG. 7, the drive motor 60 and the electronic components 111 are shifted from each other in the X direction when viewed from the top surface of the main body, so as not to interfere with each other. By disposing the electronic components 111 in these positions, the distance between the circuit board 100 and the drive motor 60 in the Y direction (front-back direction) can be shortened, and the image forming apparatus 1 can be downsized.

Configuration of Mounting to Main Body

Figure 8:
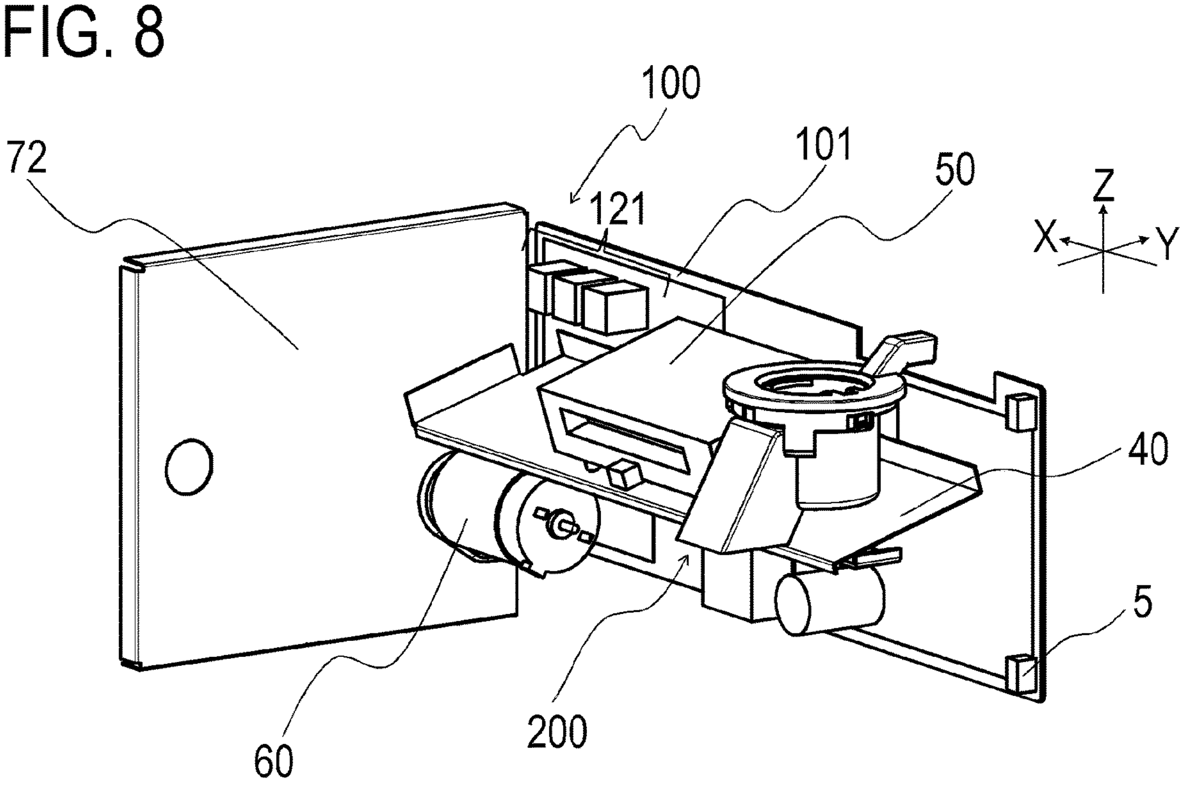
FIG. 8 is a perspective view for describing a configuration to hold a scanner unit and a drive motor.

A configuration of mounting the scanner unit 50 and the drive motor 60 to the main body will be described in detail with reference to FIG. 8. FIG. 8 is a perspective view in FIG. 5, to which the right side plate frame 72 and a scanner holding member 40 are added. Illustration of the left side plate frame 73 and the base frame 74 is omitted here. The scanner unit 50 is held by the scanner holding member 40. The scanner holding member 40 is fixed to the right side plate frame 72 and the left side plate frame 73 (not illustrated in FIG. 8) respectively, and is provided below the attached portion 200 so as to bridge these two frames. The drive motor 60, on the other hand, is mounted on the right side plate frame 72, and a gear, connected to the drive motor 60, is provided on the plus side (right side) of the right side plate frame 72 in the X direction. The drive force of the drive motor 60 is transferred to the feeding roller 5*a* and the photosensitive drum 11 via this gear.

Configuration of Circuit Board

Figure 9:
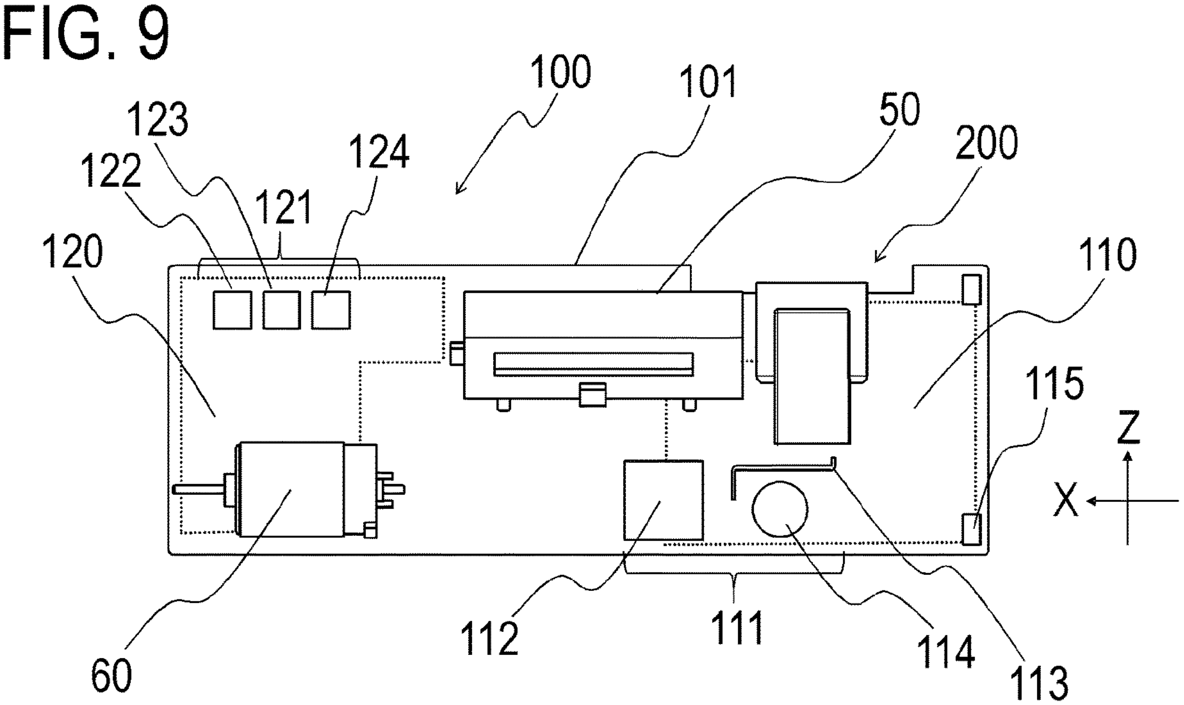
FIG. 9 is a rear view of the circuit board in a direction vertical to the board surface.
Figure 10:
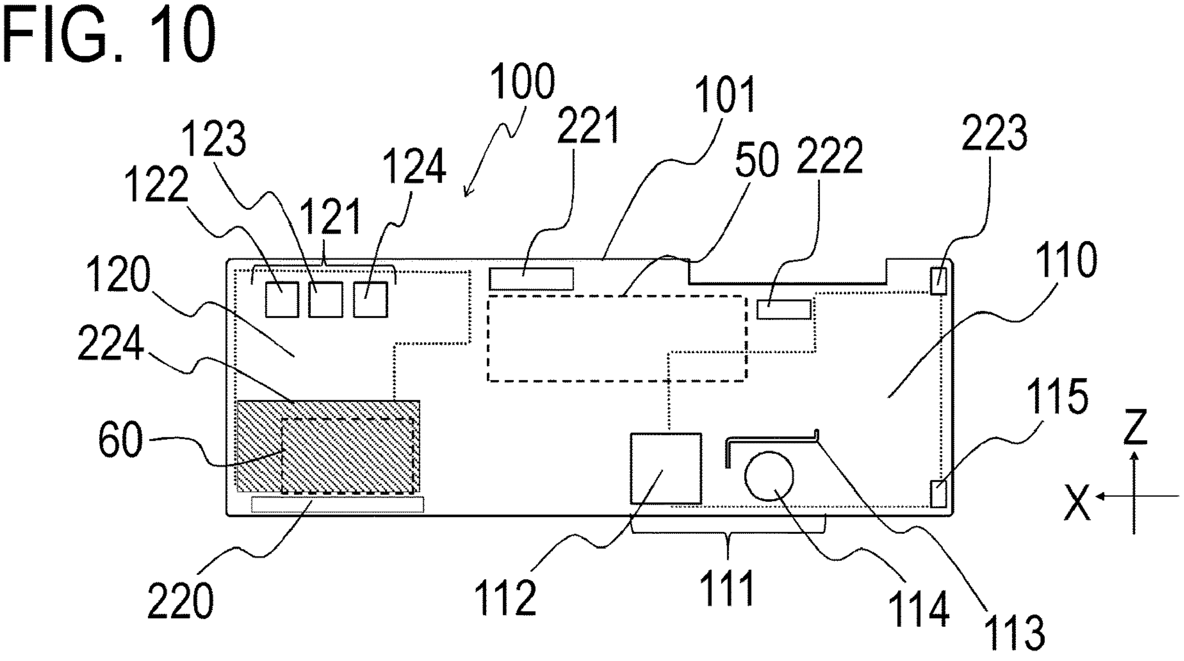
FIG. 10 is a diagram for describing electronic components on the circuit board.

A configuration of the circuit board 100 will be described with reference to FIGS. 9 and 10. FIG. 9 is a rear view of the circuit board 100 viewed from the rear side of the main body. In FIG. 9, not only the circuit board 100 but also the scanner unit 50, the drive motor 60, and the attached portion 200 are illustrated. In FIG. 10, only the circuit board 100 is illustrated. The circuit board 100 is constituted of the low voltage power supply portion 110 which receives AC power from an external commercial power supply, and converts the AC power into DC power, and a high voltage power supply portion 120 which supplies high voltage required for image formation to each process member. In the circuit board 100 of the present embodiment, the low voltage power supply portion 110 and the high voltage power supply portion 120 are mounted on the same board. The low voltage power supply portion 110 includes: a low voltage power transformer 112, a heat sink 113, and an electrolytic capacitor 114 as the electronic components 111 of which sizes in the Y direction are large. The low voltage power supply portion 110 also includes the power supply input portion 115. The high voltage power supply portion 120 includes a charging transformer 122, a developing transformer 123 and a transferring transformer 124 as the electronic components 121 of which sizes in the Y direction are large. As illustrated in FIG. 9, the electronic components 111 and 121, of which sizes in the Y direction are large, are all provided distant from the positions of the scanner unit 50, the drive motor 60 and the attached portion 200.

Other components provided on the circuit board 100 will be described with reference to FIG. 10. On the upper and lower edges of the circuit board 100, a plurality of connectors 220, 221, 222 and 223 are provided, and the circuit board 100 is connected with various members by bundle wires. The connector 220 is connected to a drive motor 60 and sensors (not illustrated) to detect the recording material P in-conveying, for example. The connector 221 is connected to a laser output portion (not illustrated) of the scanner unit 50 and a scanner motor (not illustrated) to rotate a polygon mirror. The connector 222 is connected to a control panel (not illustrated) which includes a power switch, an execution key, and the like, operated by the user, and a video controller 140. The connector 223 is connected to the fixing heater 9*c*. On a shaded portion 224 facing the drive motor 60, electronic components, of which sizes in the Y direction are small in the high voltage power supply portion 120, are mounted. Specifically, resistors, jumper wires, and the like, are provided. Resistors provided at this position have a function to adjust various biases outputted from the charging transformer 122, the developing transformer 123, and the transferring transformer 124.

Figure 11:
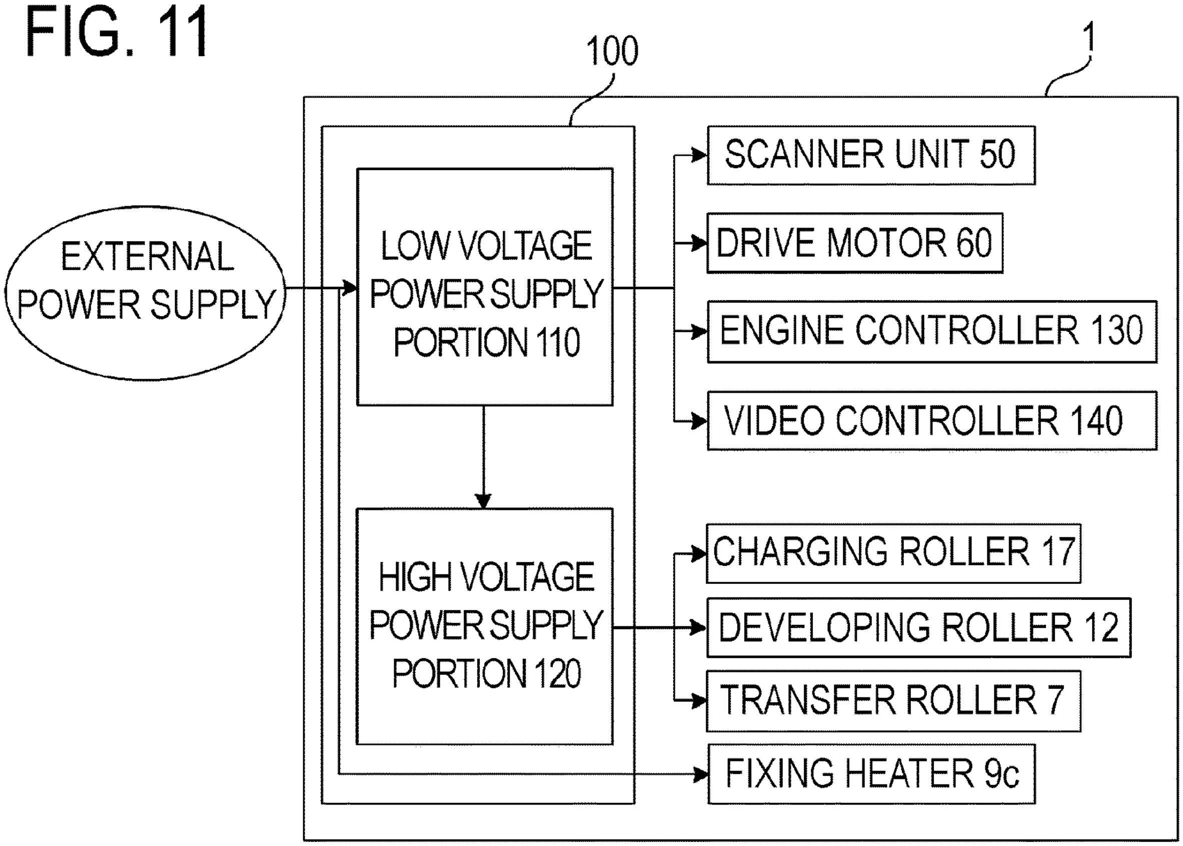
FIG. 11 is a block diagram for describing functions of the circuit board.

The functions of the low voltage power supply portion 110 and the high voltage power supply portion 120 will be described with reference to FIGS. 9 and 11. FIG. 11 is a block diagram for describing the functions of the circuit board 100. First, the low voltage power supply portion 110 receives power from an external power supply via the power supply input portion 115 mounted on the edge of the board, and converts the AC voltage into stable DC voltage by a rectifying/smoothing circuit which includes the electrolytic capacitor 114. Then the low voltage power supply portion 110 converts the DC voltage into high frequency AC voltage using such a switching element as a transistor, and inputs the high frequency AC voltage to the low voltage power transformer 112. The low voltage power transformer 112 converts the high frequency AC voltage (input voltage) into AC voltage having a desired voltage value (output voltage). The low voltage power supply portion 110 converts the AC voltage into the DC voltage again, and outputs the acquired DC voltage to the high voltage power supply portion 120. In the low voltage power supply portion 110, energy loss of an individual circuit component generates heat, hence the heat sink 113, made of aluminum or iron, is provided to release the heat.

The high voltage power supply portion 120 converts the voltage supplied from the low voltage power supply portion 110 (e.g. 24 V) into a high voltage that is required for the image forming process, which includes charging, developing and transferring. The charging transformer 122 converts the voltage supplied from the low voltage power supply portion 110 into voltage for charging, and the converted voltage is then supplied to the charging roller 17. The developing transformer 123 converts the voltage supplied from the low voltage power supply portion 110 into a voltage for developing, and the converted voltage is then supplied to the developing roller 12. The transferring transformer 124 converts the voltage supplied from the low voltage power supply portion 110 into a voltage for transferring, and the converted voltage is then supplied to the transfer roller 7.

The low voltage power supply portion 110 supplies voltage (e.g. 3.3 V or 5 V) not only to the high voltage power supply portion 120, but also to the scanner unit 50, the drive motor 60, an engine controller 130 and a video controller 140. Here, the engine controller 130 has a function to integrally control various process members. The engine controller 130 includes a CPU (not illustrated), a RAM (not illustrated) that calculates data required for controlling the image forming apparatus 1 and temporarily stores data, and a ROM (not illustrated) that stores programs and various data to control the image forming apparatus 1. The video controller 140 has a function to receive print data by communicating with such an external device as a personal computer, and to notify a result of analyzing the print data to the engine controller 130. The engine controller 130 and the video controller 140 may be provided on a board that is different from the circuit board 100, or may be provided on the same board.

The AC power, which the power supply input portion 115 received from a commercial power supply, is supplied not only to the low voltage power supply portion 110, but also to the fixing heater 9*c*. In the circuit board 100 illustrated in FIG. 10, a triac (not illustrated) is provided between the power supply input portion 115 and the connector 223, and the temperature of the fixing heater 9*c* can be adjusted by switching the triac ON/OFF, so as to change the sine wave. Driving of the roller and the like in the fixing apparatus 9 is performed by the drive motor 60.

Disposition and Configuration of Replenishing Unit

The attached portion 200 will be described with reference to FIGS. 12 to 22. As mentioned above, in the image forming apparatus 1, the attached portion 200, which replenishes toner from an outside source when the residual amount of toner in the container portion 18 is low, is provided so that the container portion 18 need not be detached from the housing 720. In the attached portion 200, which is a toner container (developer container), a replenishing pack 210 can be detached/attached.

Figure 12:
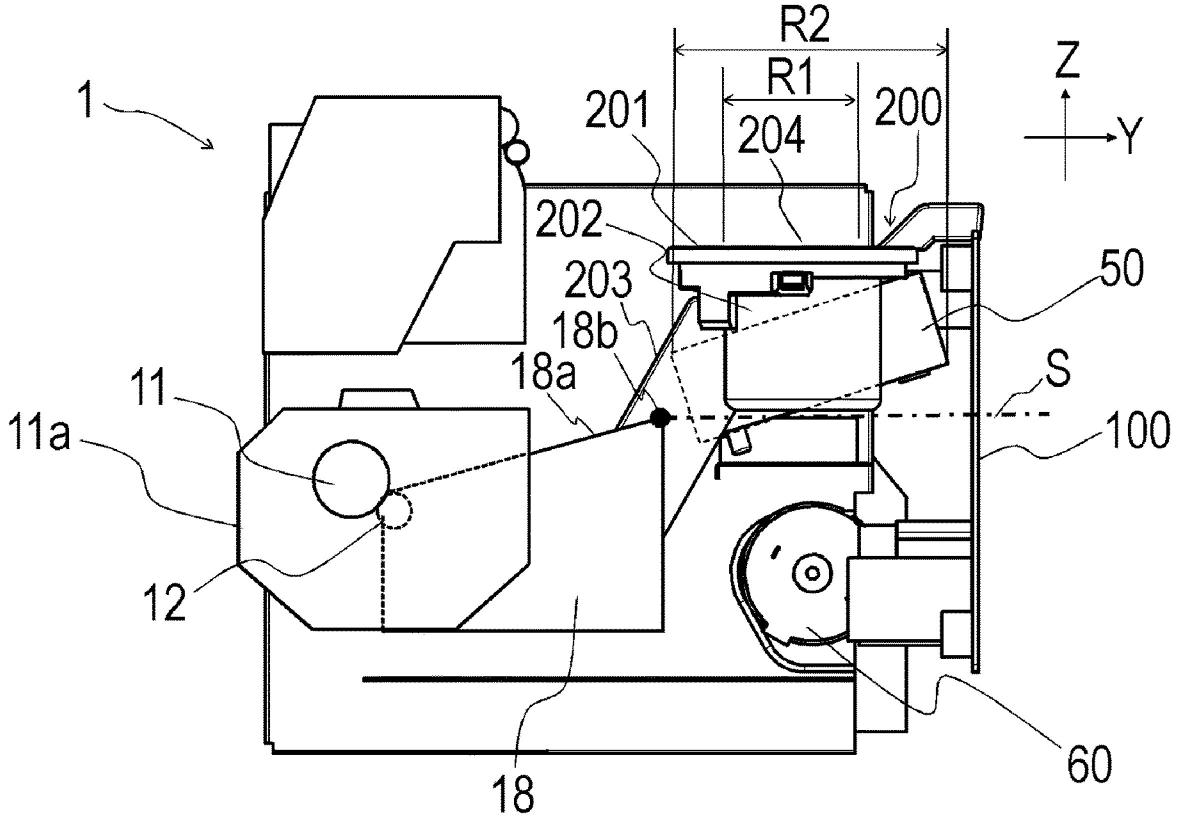
FIG. 12 is a side view for describing the positions of a replenishing portion and a scanner unit.

FIG. 12 is a left side view of the image forming apparatus 1 viewed in the rotation axial line direction of the photosensitive drum 11. In FIG. 12, the exterior cover 71 and the left side plate frame 73 have been removed. The attached portion 200 is constituted of: a mounting portion 201 where the replenishing pack 210 (not illustrated in FIG. 12) is mounted; a toner-receiving portion 202 which is a cylindrical-shaped frame; and a replenishing path portion 203 that connects the container portion 18 and the toner-receiving portion 202. The mounting portion 201 includes a replenishing port 204, which is an opening to replenish toner, and is configured such that the toner which passed through the replenishing port 204 moves on to the toner-receiving portion 202 and the replenishing path portion 203 sequentially, and is finally supplied to the container portion 18. A part of the scanner unit 50 is at a position which overlaps with the attached portion 200, and cannot be seen, hence this region is indicated by a dotted line in FIG. 12. Specifically, the toner-receiving portion 202 and the replenishing path portion 203 of the attached portion 200 overlap with the scanner unit 50. In other words, the toner-receiving portion 202 and the replenishing path portion 203 are at positions overlapping with the scanner unit 50 in the Z direction. Here, if it is assumed that R1 is a region where the replenishing port 204 is provided in the Y direction (horizontal direction), and R2 is a region where the scanner unit 50 is provided in the Y direction, then R1 and R2 overlap.

It is also assumed that S is a virtual plane that passes through an upper edge 18*b*, which is located at the uppermost side of a frame 18*a* of the container portion 18, and is parallel with the horizontal plane. The virtual plane S is indicated by dashed lines in FIG. 12. If the virtual plane S is a reference, then a part of the attached portion 200 is located at the plus side (upper side) in the Z direction. In other words, a part of the attached portion 200 projects upward from the upper edge 18*b* of the container portion 18. Specifically, a part of the attached portion 200 includes the entire mounting portion 201, a part of the toner-receiving portion 202, and a part of the replenishing path portion 203. The part of the toner-receiving portion 202 and the part of the replenishing path portion 203, which project upward from the virtual plane S, overlap with the scanner unit 50.

As illustrated in FIG. 12, a part of the container portion 18 is at a position overlapping with a drum frame 11*a* that supports the photosensitive drum 11, and cannot be seen, hence this region is indicated by a dotted line. The container portion 18 supports the developing roller 12 which bears the developer, and this developing roller 12 is also at a position that cannot be seen, hence is indicated by a dotted line in FIG. 12.

Figure 13:
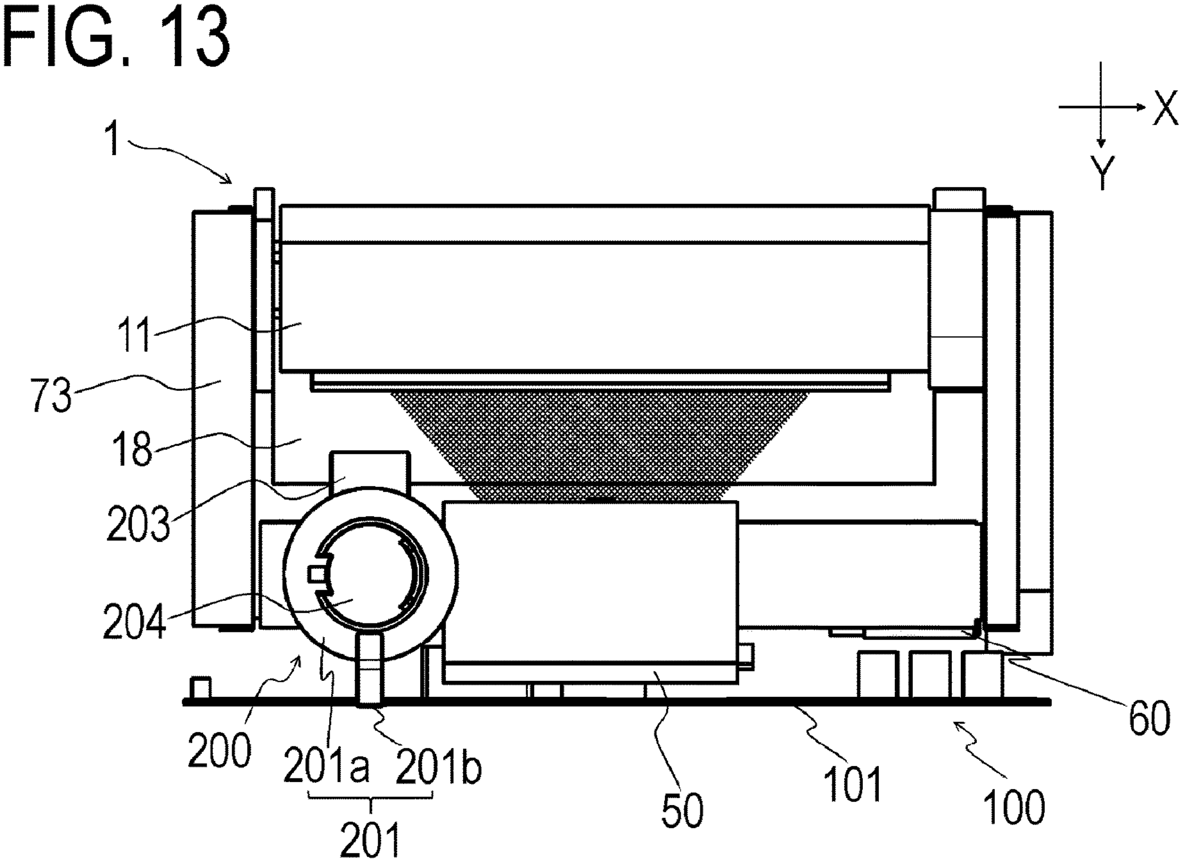
FIG. 13 is a top view for describing the positions of a replenishing portion and the scanner unit.

FIG. 13 is a top view of the image forming apparatus 1 when the exterior cover 71 is removed. As mentioned above, the mounting portion 201 includes the replenishing port 204. The mounting portion 201 also includes a ring portion 201*a* which is provided to surround the replenishing port 204, and a lever portion 201*b* which is connected to the ring portion 201*a*. As illustrated in FIG. 13, the width of the attached portion 200 in the X direction is shorter than the width of the container portion 18 in the X direction.

Here, the laser beam emitted from the scanner unit 50 onto the photosensitive drum 11 spreads in a trapezoidal shape, as illustrated in FIG. 13, due to the functions of the polygon mirror and the lens (neither illustrated). Therefore the width of the scanner unit 50 in the X direction is shorter than the width of the photosensitive drum 11. As a result, a space is created between the left end of the scanner unit 50 and the left side plate frame 73, and in the present embodiment, the attached portion 200 is provided in this space. In other words, the attached portion 200 is provided between the scanner unit 50 and the left side plate frame 73 in the X direction, as illustrated in FIG. 13. Further, the replenishing port 204 and the scanner unit 50 are provided side-by-side in the X direction, in a region where the container portion 18 is provided. If the attached portion 200 is provided at this position, the size of the image forming apparatus 1 is little influenced by disposing the attached portion 200.

The attached portion 200 is provided on opposite sides of the drive motor 60 with respect to the scanner unit 50. The drive motor 60 used in the present embodiment is relatively small, hence as illustrated in FIG. 12, the attached portion 200 and the drive motor 60 do not overlap in the Z direction. Therefore it is possible to provide the attached portion 200 and the drive motor 60 on the same side with respect to the scanner unit 50, but in the case of using a larger drive motor 60, the attached portion 200 must be provided at an upper position, which increases the size of the image forming apparatus 1. If the configuration where the attached portion 200 is provided on the opposite side of the drive motor 60 is used, as described in the present embodiment, a larger drive motor 60 can be used without increasing the size of the image forming apparatus 1. In other words, design flexibility can be improved.

Description of Replenishing Configuration

Figure 14:
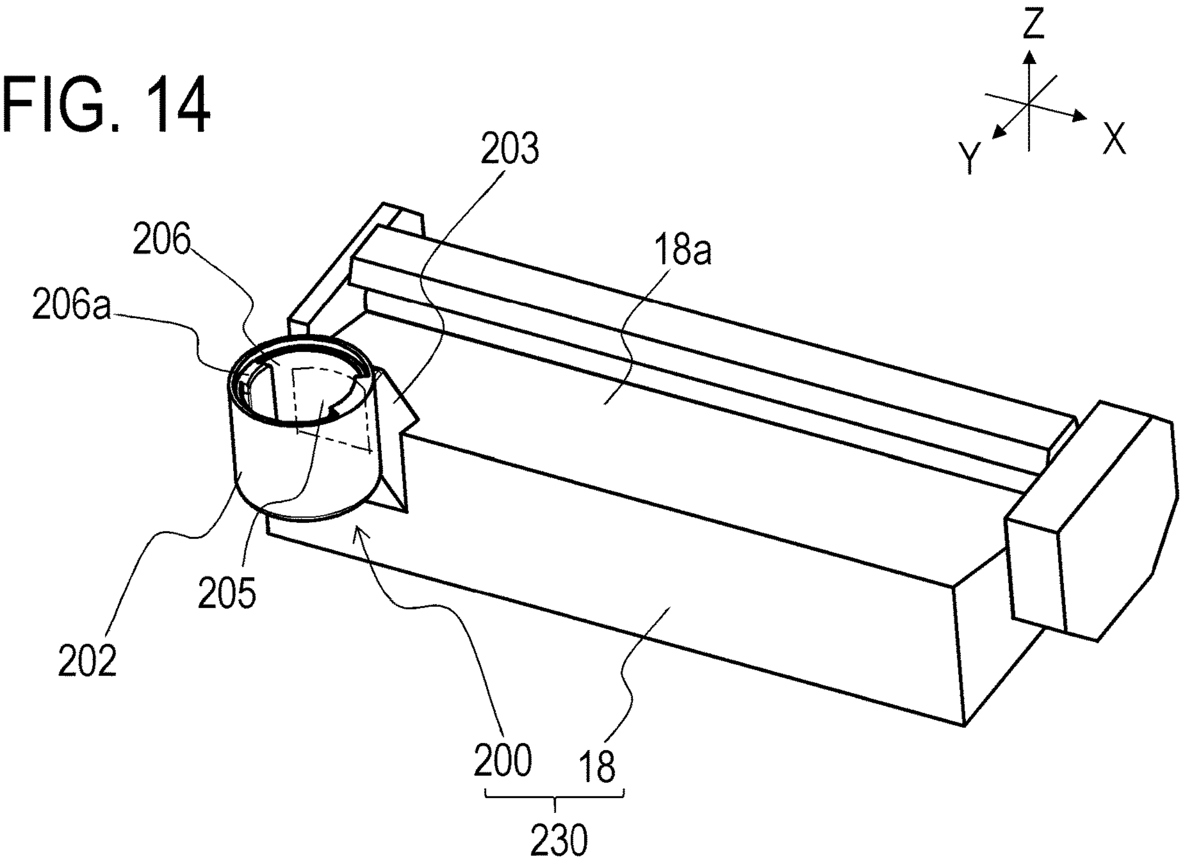
FIG. 14 is a perspective view of a developer container.

FIG. 14 is a perspective view of a developer container 230 constituted of the container portion 18 and the attached portion 200. In FIG. 14, illustration of a part of members associated with the attached portion 200 is omitted. On the inner wall of the cylindrical-shaped toner-receiving portion 202, a side surface opening 205, which is connected to the replenishing path portion 203, is formed, but the side surface opening 205 is covered by a main body shutter portion 206 and cannot be seen, hence is indicated by dotted lines. Toner is guided from the toner-receiving portion 202 to the replenishing path portion 203 via this side surface opening 205, and is then contained in the container portion 18 via the replenishing path portion 203. On the main body shutter portion 206, a main body shutter portion driving transfer rib 206*a* is provided and used to receive driving force for the replenishing pack 210, and to rotate the main body shutter portion 206 (details described later).

Figure 15A:
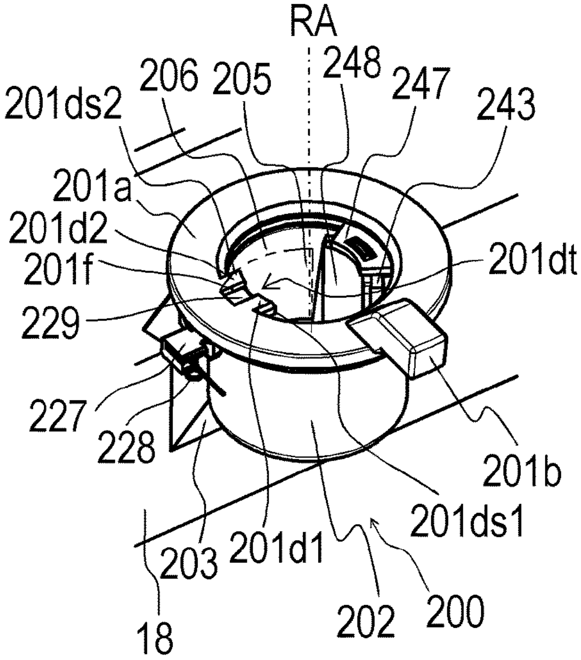
FIGS. 15A to 15C are enlarged perspective views of the replenishing portion.
Figure 15B:
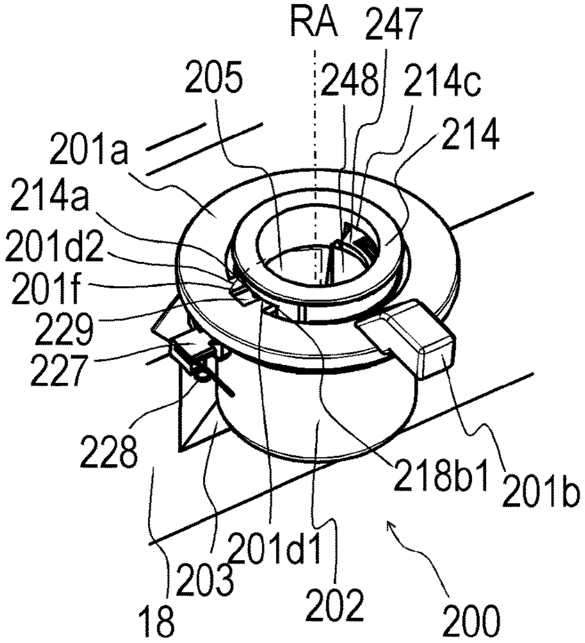
Figure 15C:
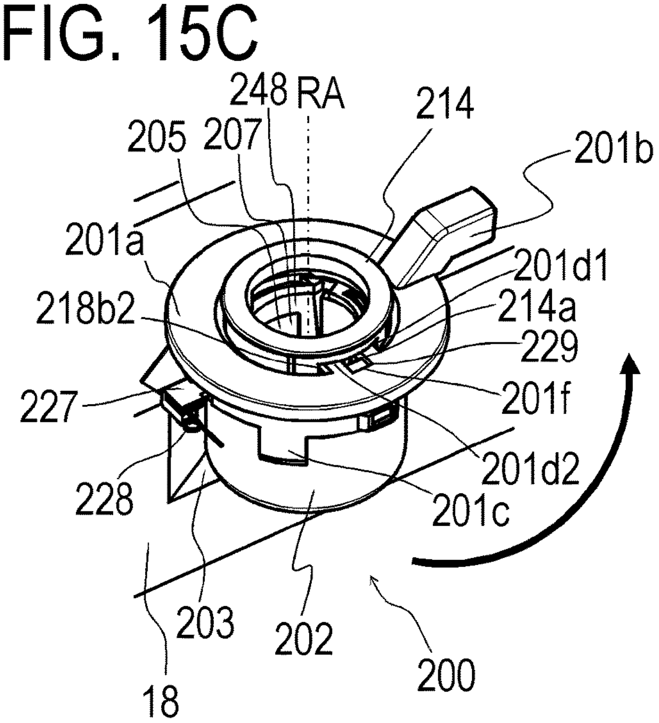
Figure 15C:
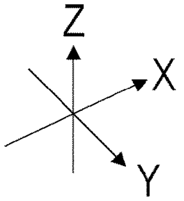

FIGS. 15A to 15C are enlarged perspective views of the attached portion 200, and FIGS. 16A to 16D are enlarged cross-sectional views of the mounting portion 201 viewed from the top surface. In FIG. 15A, the side surface opening 205 formed in the toner-receiving portion 202 is covered by the main body shutter portion 206, and cannot be seen, hence is indicated by a dotted line. The main body shutter portion 206 is a cylindrical-shaped member which is concentric with the toner-receiving portion 202, and is provided at the inside of the toner-receiving portion 202. An opening 207 for the toner to pass though is also formed in the main body shutter portion 206. In FIG. 15A, the side surface opening 205 and the opening 207 are provided at positions that are shifted from each other, hence the side surface opening 205 is closed. The mounting portion 201 is provided in a top surface portion 240 (not illustrated), so as to be concentric with the toner-receiving portion 202, and is restricted in the rotating direction by a later mentioned lever lock mechanism when the replenishing pack 210 is not attached. This lever mechanism can prevent a shift in phases of a mounting portion driving transfer rib 201*d* and the main body shutter portion driving transfer rib 206*a* before attaching the replenishing pack 210, so that the replenishing pack 210 can be attached with certainty.

Figure 16A:
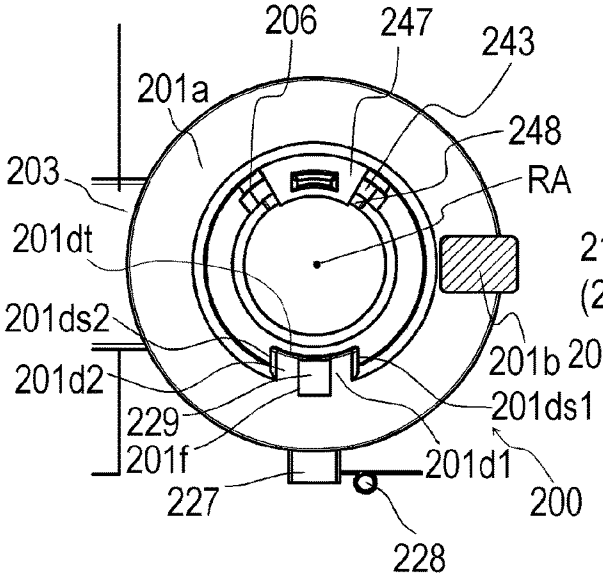
FIGS. 16A to 16D are cross-sectional top views of the replenishing portion.
Figure 16B:
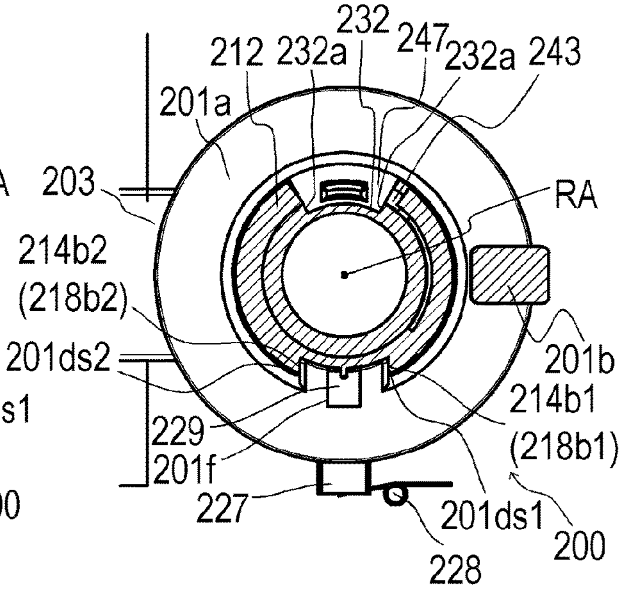
Figure 16B:
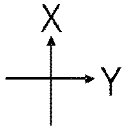
Figure 16C:
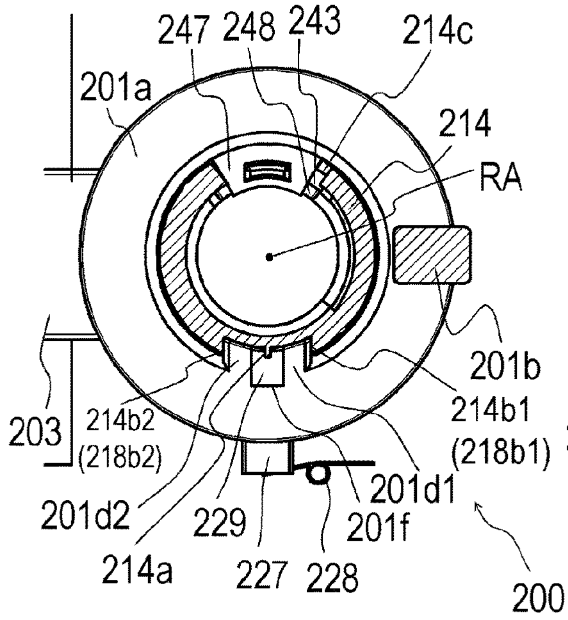

As illustrated in FIGS. 15B and 16C, when the replenishing pack 210 is attached, a lever lock release rib 214*a*, which is a release portion provided in pack shutter portion 214 (shutter member), is inserted into a lock release recessed portion 201*f*. In FIGS. 15B and 16C, only the pack shutter portion 214 of the replenishing pack 210 is illustrated. The lever lock release rib 214*a* is a projecting portion that projects from an outer surface of the pack shutter portion 214, which extends in the rotation axial line direction, in a direction intersecting with the rotation axial line. When the replenishing pack 210 is attached to the attached portion 200, the lever lock release rib 214*a* moves a lever lock release link 229, whereby the lever lock mechanism is released, and the lever portion 201*b* can be rotated. The lever lock mechanism will be described in detail later. A state of engagement between a guided portion 232 of an inserting portion 212 (discharging portion engaging portion) and a guiding portion 247 (248) of the toner-receiving portion 202 (frame engaged portion) is as illustrated in FIG. 16B. By this engaging configuration, the relative movement between the inserting portion 212 and the toner-receiving portion 202, in the circumferential direction centering the rotation axial line of the pack shutter portion 214, can be mutually restricted. Details will be described later.

Figure 16D:
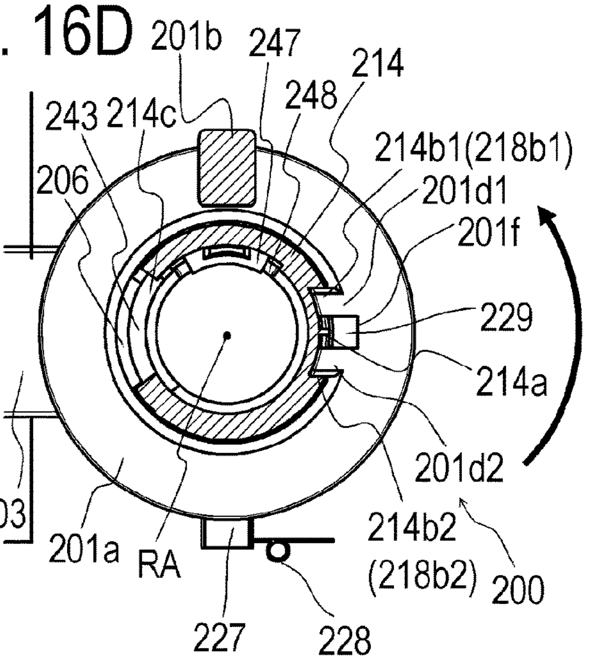

The mounting portion driving transfer rib 201*d* is engaged with the main body shutter portion driving transfer rib 206*a* via a pair of driving transfer surfaces 214*b* of the pack shutter portion 214 of the replenishing pack 210. The mounting portion driving transfer rib 201*d* is a protruded portion (rotting member protruded portion) that extends from an inner peripheral surface, centering the rotation axial line R of a hole formed in the approximately annular mounting portion 201, to the rotation axial line RA. The mounting portion driving transfer rib 201*d* includes a first engaging portion 201*dl* and a second engaging portion 201*d*2, which are portions to form a first projected portion side surface 201*ds*1 and a second projected portion side surface 201*ds*2, and which are arranged across a projected portion front end surface 201*dt* in the circumferential direction centering the rotation axial line RA. The main body shutter portion driving transfer rib 206*a* is a projected portion (shutter convex portion) that extends from the inner peripheral surface, centering the rotation axial line R of the hole formed in the approximately cylindrical main body shutter portion 206, to the rotation axial line RA. The main body shutter portion driving transfer rib 206*a* includes a first shutter projected portion side surface 206*al* and a second shutter projected portion side surface 206*a*2, which are arranged across a shutter projected portion front end surface 206*at* in the circumferential direction centering the rotation axial line RA. The main body shutter portion 206 can be rotated inside the toner-receiving portion 202 by the user holding the lever portion 201*b* and moving the lever portion 201*b* from the state in FIGS. 15B and 16C to the state in FIGS. 15C and 16D. In FIGS. 15C and 16D, the side surface opening 205 and the opening 207 are at overlapping positions, hence the side surface opening 205 is opened, and toner can be replenished through the side surface opening 205.

In the case where an image is formed on the recording material P, the side surface opening 205 must be shut off (closed) so that the toner being stirred in the container portion 18 by the stirring member (not illustrated) does not leak through the side surface opening 205. Hence, when an image is formed, the lever portion 201*b* is moved to the position indicated in FIGS. 15A and 16A. This position is referred to as an initial position or operation position of the lever portion 201*b*. In the case where toner is replenished from the replenishing pack 210 (described later) to the container portion 18, on the other hand, the side surface opening 205 must be opened. Hence, when toner is replenished, the lever portion 201*b* is moved to the position indicated in FIGS. 15C and 16D. This position is referred to as a replenishing position of the lever portion 201*b*.

Figure 22:
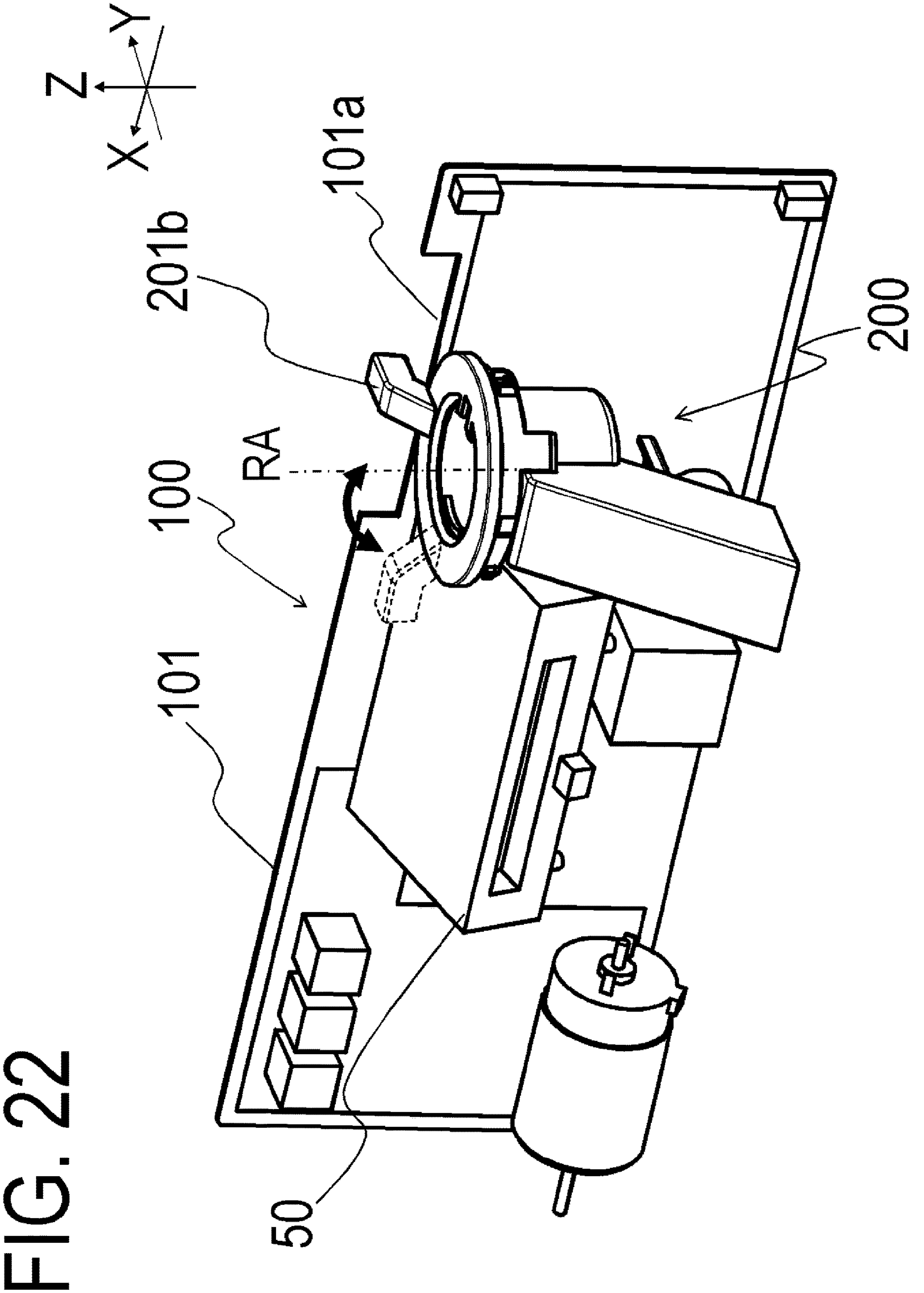
FIG. 22 is a perspective view for describing a rotation locus of a mounting portion.
Figure 23:
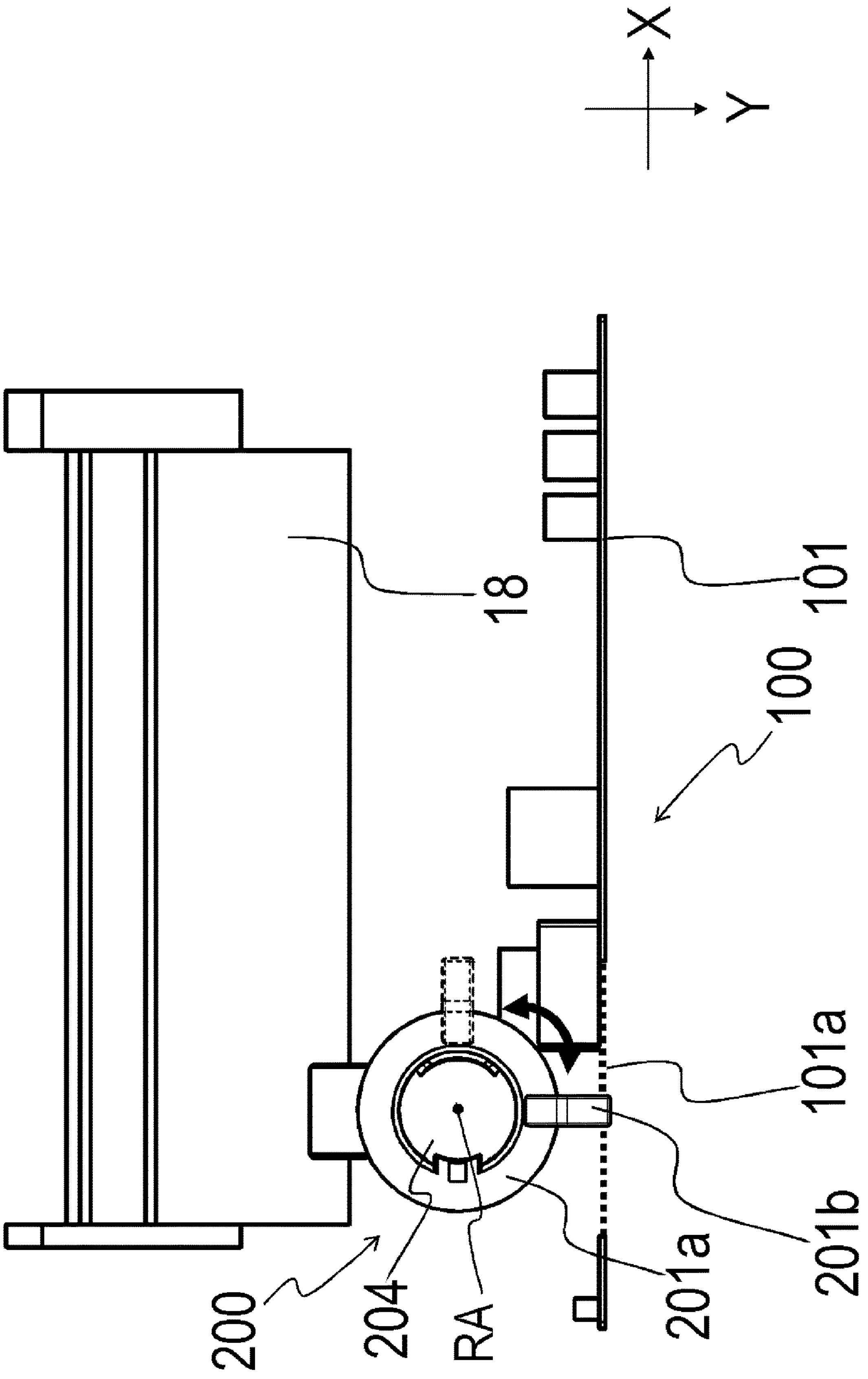
FIG. 23 is a top view for describing the rotation locus of the mounting portion.

Here, it is preferable that the size of the lever portion 201*b* is as large as possible, so that the user can hold the lever portion 201*b* easily. The configuration of the operation portion for the user to open/close the shutter is not limited to the configuration using the lever portion 201*b*. Various configurations may be used as long as at least a part of the mounting portion 201 is exposed in a state where the replenishing pack 210 is mounted so that the user can operate the part. Further, the circuit board 100 is provided on the front side (plus side of Y direction) of the attached portion 200, and in the present embodiment, the attached portion 200 and the circuit board 100 are provided in proximity to each other in order to downsize the image forming apparatus 1 in the Y direction. Therefore, as illustrated in FIGS. 22 and 23, a notch 101*a* is formed on the upper edge of the wiring board 101, so as to prevent contact with the lever portion 201*b*. FIG. 22 is a perspective view viewed from the rear side of the main body, and FIG. 23 is a top view. In FIG. 23 the position corresponding to the notch 101*a* is indicated by a dotted line. The lever portion 201*b* in the initial position overlaps with the wiring board 101. As illustrated in FIGS. 22 and 23, the notch 101*a* is formed at a position corresponding to the rotation locus of the lever portion 201*b*. In the present embodiment, the notch 101*a* is formed on the wiring board 101, but interference with the lever portion 201*b* may be prevented by forming a through hole or a groove in the wiring board 101.

The configuration of receiving replenishment of the developer in the image forming apparatus or the image forming system according to the present embodiment will be described in detail with reference to FIGS. 19A, 19B, 20A to 20C, 21A, and 21B.

Figure 19A:
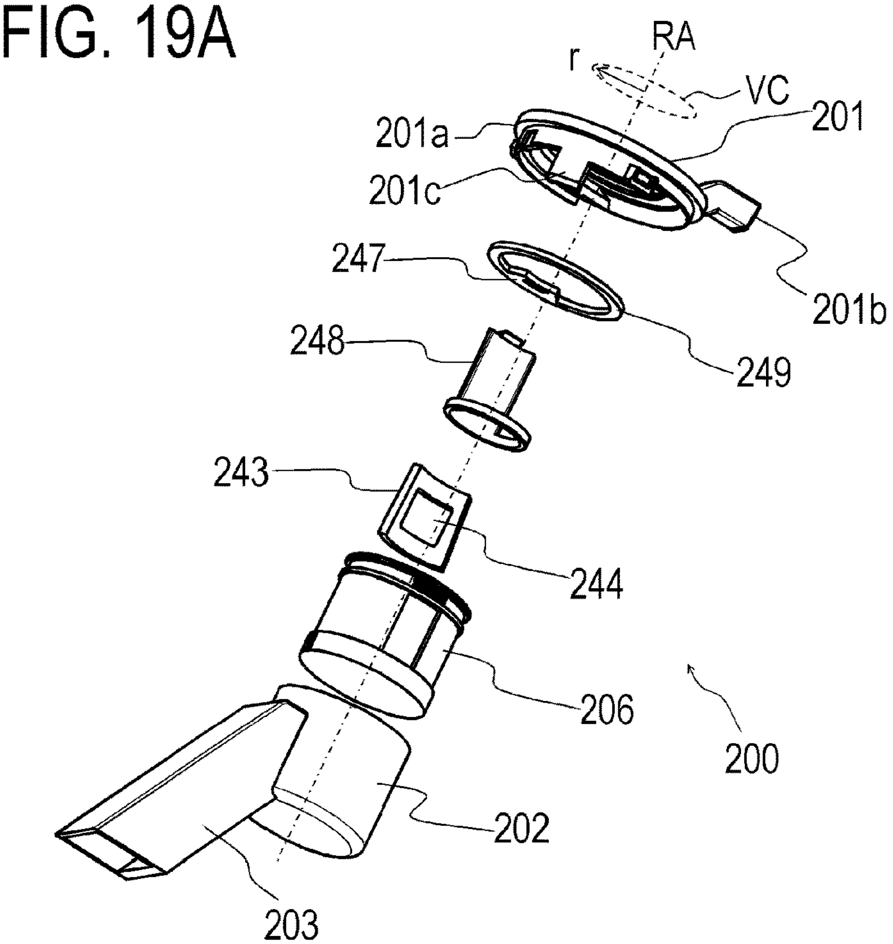
FIGS. 19A and 19B are exploded perspective views of an attached portion.
Figure 19B:
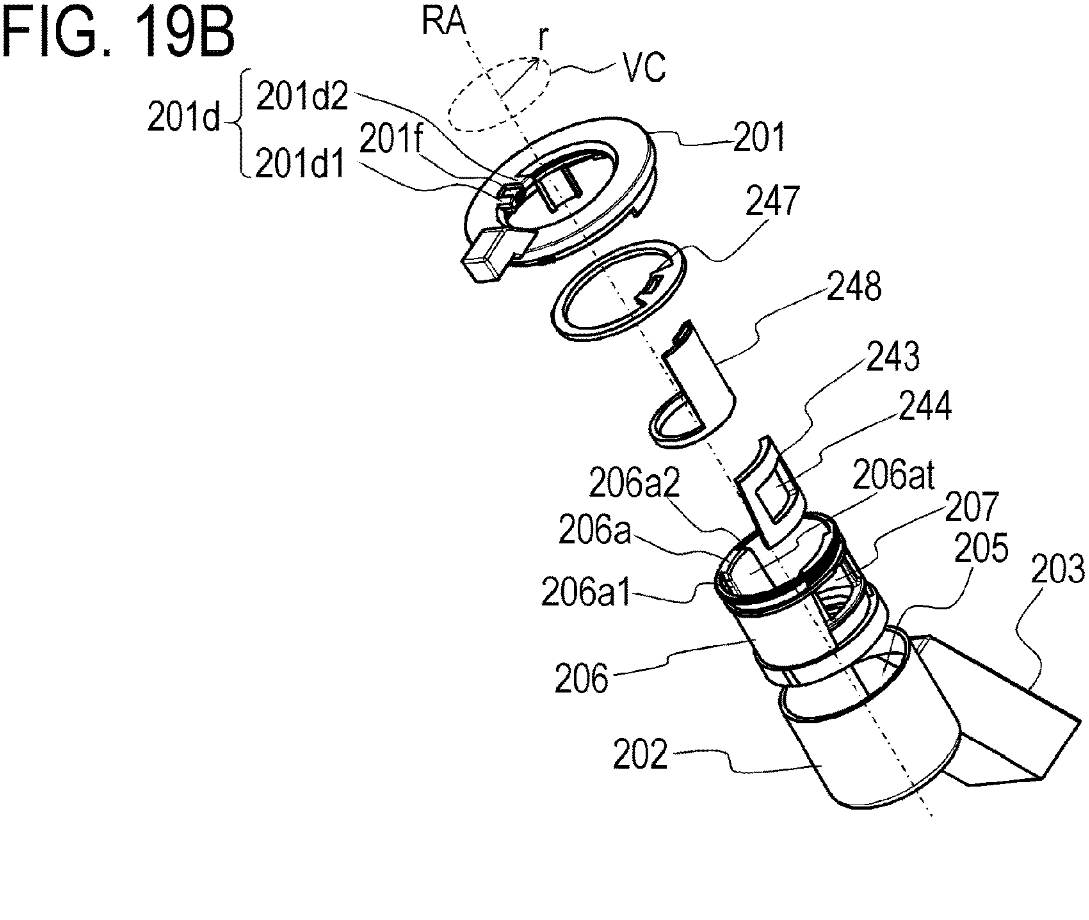
Figure 20A:
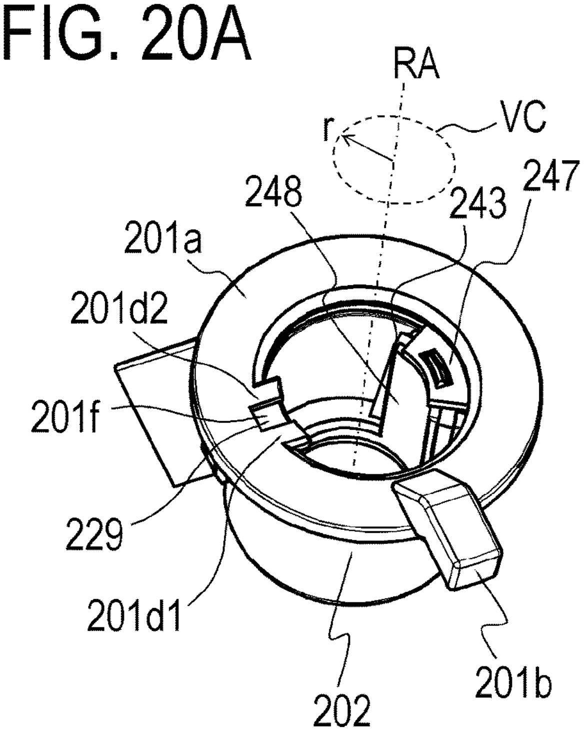
FIGS. 20A to 20C are perspective views of the attached portion.
Figure 20B:
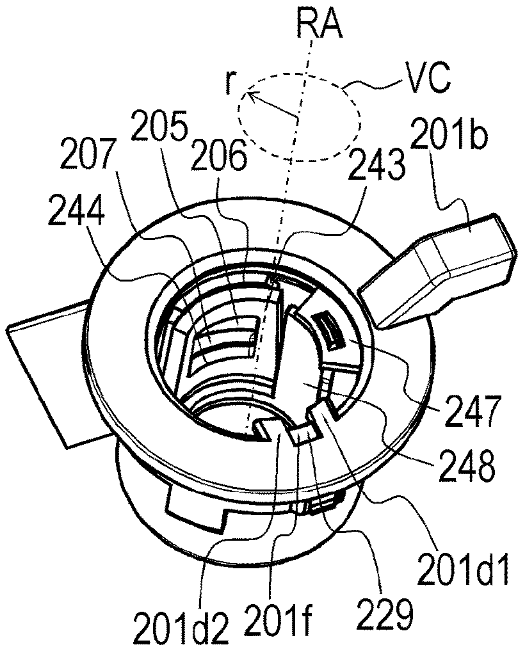
Figure 20C:
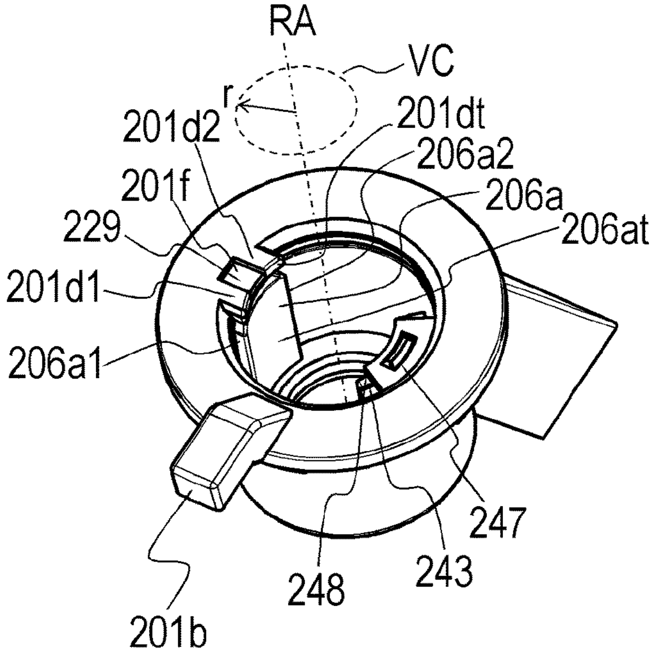

FIGS. 19A and 19B are exploded perspective view of the attached portion 200. FIGS. 19A and 19B are perspective views viewed from different directions. FIGS. 20A to 20C are perspective views of the attached portion 200, and unlike FIGS. 15A to 15C, illustration of the replenishing pack 210, a lever lock member 227 and a lever lock portion pressing spring 228 is omitted. FIGS. 20A and 20C indicate a state where the mounting portion 201 (opening/closing member) is at a closed function position viewed from different perspective directions. The mounting portion 201 is provided so as to be located outside the pack shutter portion 214 in the radius direction r of a virtual circle VC, centering the rotation axial line RA, when the mounting portion 201 is viewed in the rotation axial line direction in the state where the replenishing pack 210 is attached. FIG. 20B indicates a state where the mounting portion 201 is at an open function position. The main body shutter portion 206 (apparatus shutter) is provided on the inside of the toner-receiving portion 202 (developer-receiving portion). The main body shutter portion 206 includes the opening 207 (apparatus opening) to form a communication hole to replenish toner, and a sealing member 243 is adhered to the inner peripheral surface of the main body shutter portion 206, so as to surround the outer periphery of the opening 207. When the main body shutter portion 206 is at the open position, the sealing member 243 contacts with the outer surface of the inserting portion 212, particularly around the opening 213, and seals the later mentioned communication hole 245. On the inside of the communication hole 245, guiding portions 247 and 248 (frame engaged portions) that guide a guided portion 232 (discharging portion engaging portion) of the inserting portion 212 of the replenishing pack 210 are provided. Furthermore, the main body shutter portion driving transfer rib 206*a*, which guides a positioning portion 217 (a guided portion of the pack shutter portion 214 (cylindrical container shutter) is also provided on the inner peripheral surface of the main body shutter portion 206. At the opening side of a recessed inserting portion configuration of the attached portion 200 where a protruded inserting portion 212 of the replenishing pack 210 is inserted, a mounting portion 201 (opening/closing member) is rotatably mounted. The mounting portion driving transfer rib 201*d*, which projects inward from the inner peripheral surface side of the mounting portion 201, is also a guiding portion that guides the positioning portion 217 of the pack shutter portion 214. When the pack shutter portion 214 is at the close position, the guided portion 232 can be engaged with the guiding portions 247 and 248, and the positioning portion 217 can be engaged with the mounting portion driving transfer rib 201*d* and the main body shutter portion driving transfer rib 206*a*.

Figure 21A:
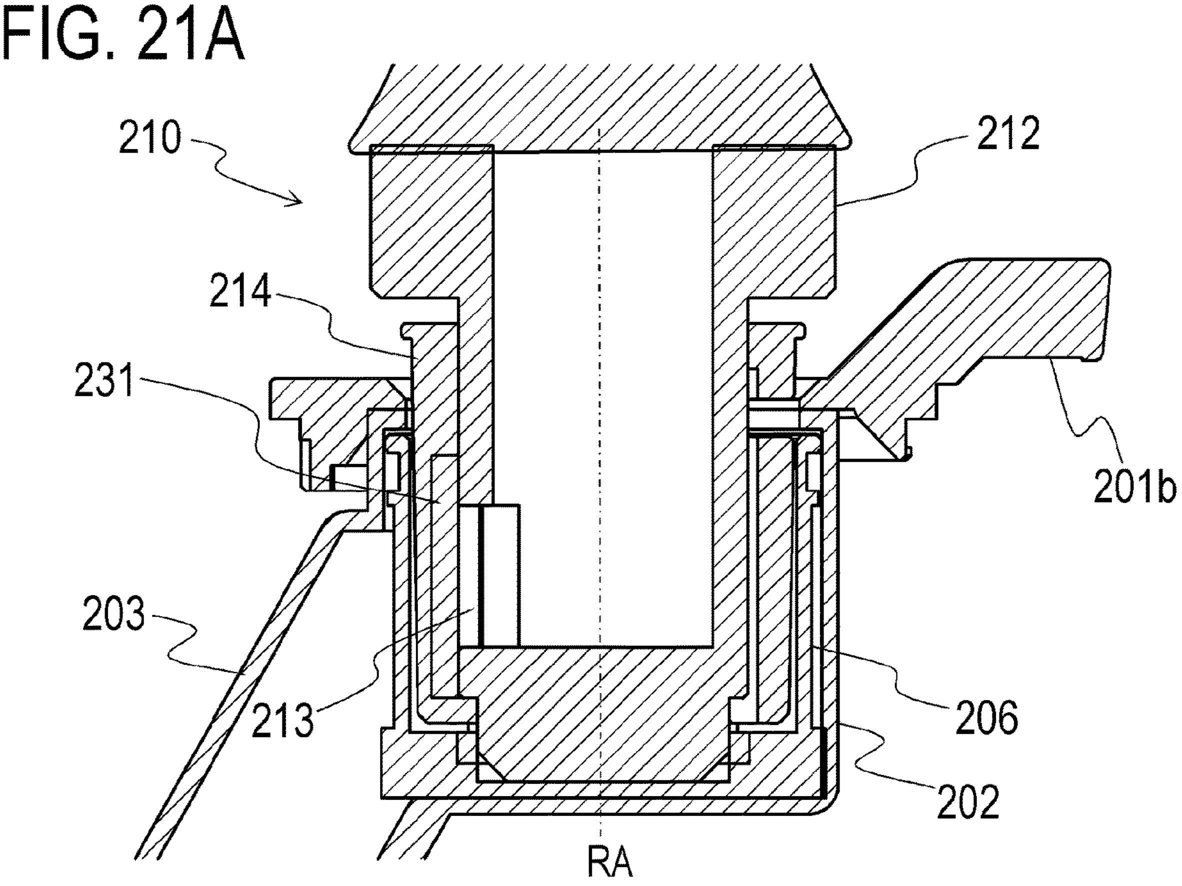
FIGS. 21A and 21B are cross-sectional views of the replenishing pack and the attached portion.
Figure 21B:
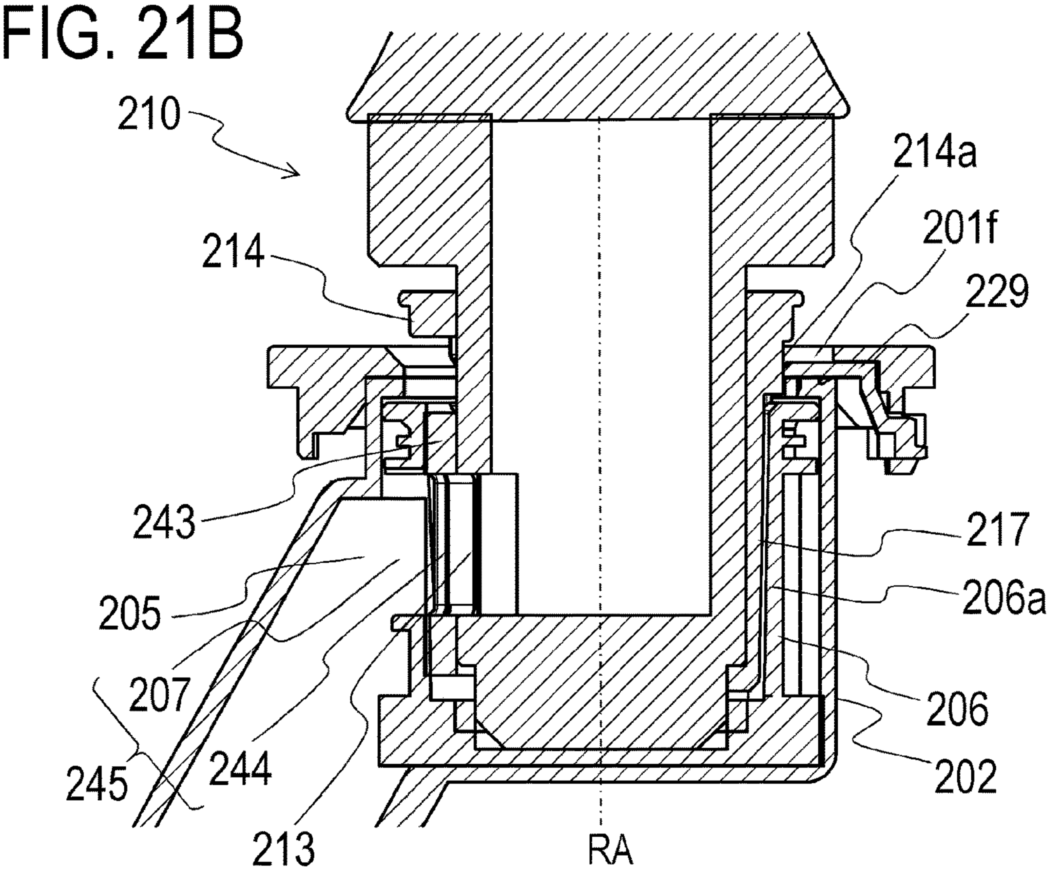

FIGS. 21A and 21B are schematic cross-sectional views of the replenishing pack 210 and the attached portion 200. FIG. 21A indicates a state where the mounting portion 201 is at the close function position, and each shutter is at the close position. In other words, the opening 213 (container opening) is closed by the sealing member 231 provided on the inner peripheral surface of the pack shutter 214, and the side surface opening 205 (receiving port) is closed by the main body shutter portion 206. FIG. 21B indicates a state where the mounting portion 201 is at the open function position, and each shutter is at the open position. In other words, the opening 213 and the receiving port 205 communicate through a communication hole 245, which is formed by the opening 207 provided in the main body shutter portion 206, and the opening 244 of the sealing member 243, provided on the inner peripheral surface of the main body shutter portion 206 so as to surround the opening 207. In other words, this is a state where toner (developer) can be replenished from the replenishing pack 210 (developer container) to the image forming apparatus 1.

Configuration of Replenishing Container

Configuration of the replenishing pack 210 (replenishing container) will be described with reference to FIGS. 18A and 18B. The replenishing pack 210 includes: a pouch portion 211 containing toner to be replenished; a discharging portion (nozzle portion, pipe, tube, valve) 212 that is a cylindrical-shaped inserting portion to be inserted into the replenishing port 204 that discharges the toner inside the pouch portion; an opening 213 that is formed on the side surface of the inserting portion 212 for the toner to pass through; and the pack shutter portion 214 that covers the opening 213 to prevent the leakage of toner. The pouch portion 211 is formed to be flatter in the direction toward the opposite side of the inserting portion 212, and a pouch edge 216, extending in a predetermined direction, is formed on the edge. The pouch portion 211 is a pouch formed by performing pouch processing on a flexible polypropylene sheet, but the container portion of the toner is not limited to a pouch, and may be a resin bottle, a paper or vinyl container, or the like.

Figures 18A, 18B:
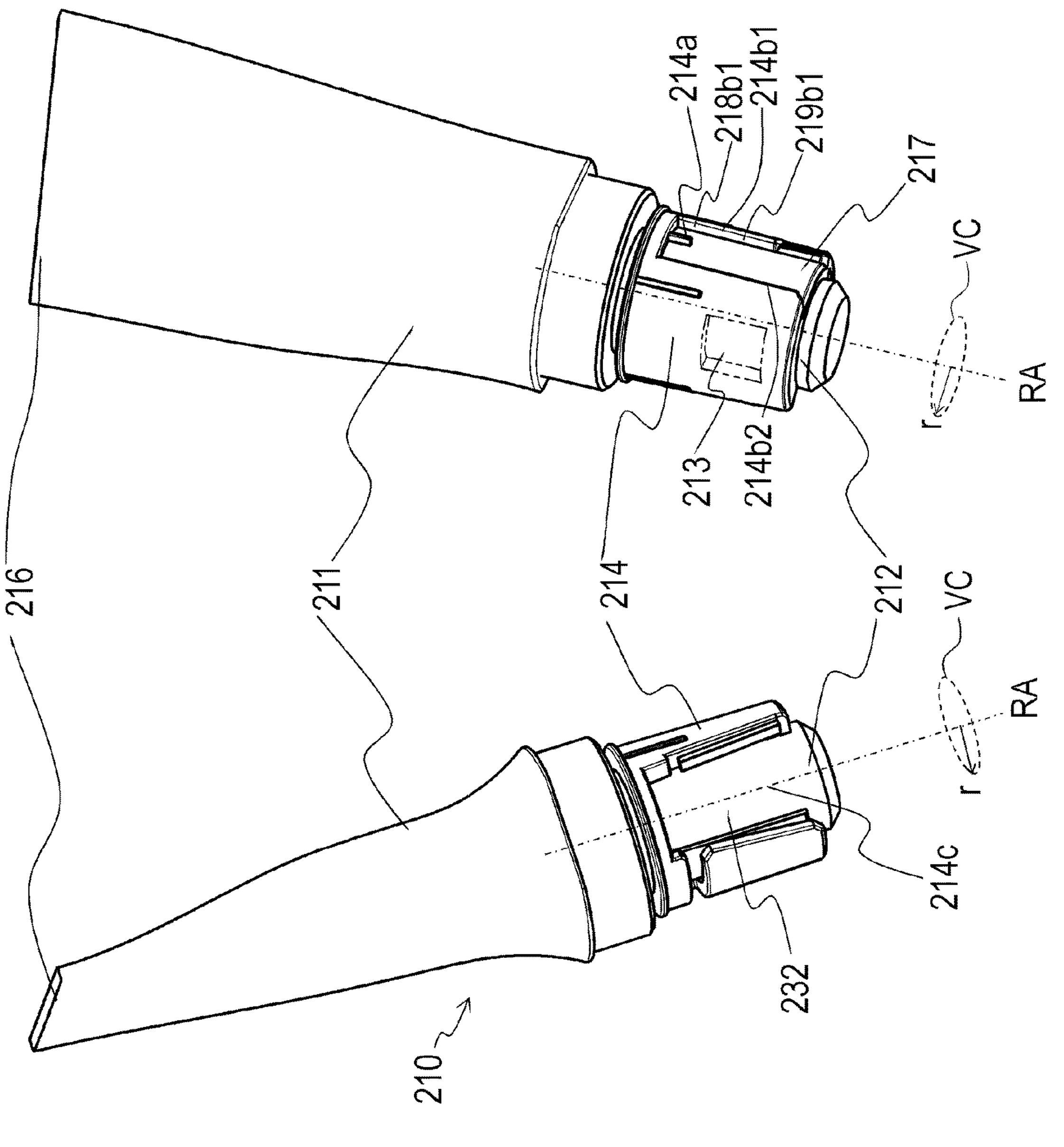
FIGS. 18A and 18B are diagrams for describing a configuration of the replenishing pack.

As illustrated in FIG. 18A, a pack shutter portion opening 214*c* is formed on the pack shutter portion 214. When the pack shutter portion 214 is rotated and the pack shutter portion opening 214*c* and the opening 213 of the inserting portion 212 match (rotation phase positions thereof overlap), toner can be replenished from the replenishing pack 210. FIG. 18B is a view of the replenishing pack 210 viewed from an angle different from FIG. 18A. The opening 213 formed in the inserting portion 212 is covered by the pack shutter portion 214, and cannot be seen, hence is indicated by a dotted line.

The pack shutter portion 214 is a cylindrical-shaped member that is concentric with the inserting portion 212, and is rotatably provided at the outer side (at outer periphery) of the inserting portion 212. On the outer peripheral surface of the pack shutter portion 214, a positioning portion 217, which engages with the mounting portion 201 and the driving transfer surfaces 214*b*, which face each other via the positioning portion 217 in the circumferential direction of the outer periphery of the pack shutter portion 214, are provided. In other words, on the outer peripheral surface of the pack shutter portion 214, a groove (a recessed portion that is recessed inward from the outer peripheral surface of the pack shutter portion 214 in the radius direction r of a virtual circle VC), which is constituted of the positioning portion 217 as a groove bottom surface (recessed portion bottom surface) and the driving transfer surfaces 214*b* as groove side surfaces, is formed. This groove is open at the front end portion of the outer peripheral surface of the pack shutter portion 214 in the inserting direction of the inserting portion 212. The pack shutter portion 214 is rotated with respect to the inserting portion 212 by the driving transfer surfaces 214*b* receiving force in the circumferential direction from the mounting portion driving transfer rib 201*d*. Between the driving transfer surfaces 214*b*, a rib 214*a*, to release the lever lock mechanism of the mounting portion 201, is provided. By disposing the rib 214*a* to release the lever lock mechanism between the driving transfer surfaces 214*b*, the lever lock mechanism of the mounting portion 201 can be accurately released when the replenishing pack 210 is attached.

Figure 17A:
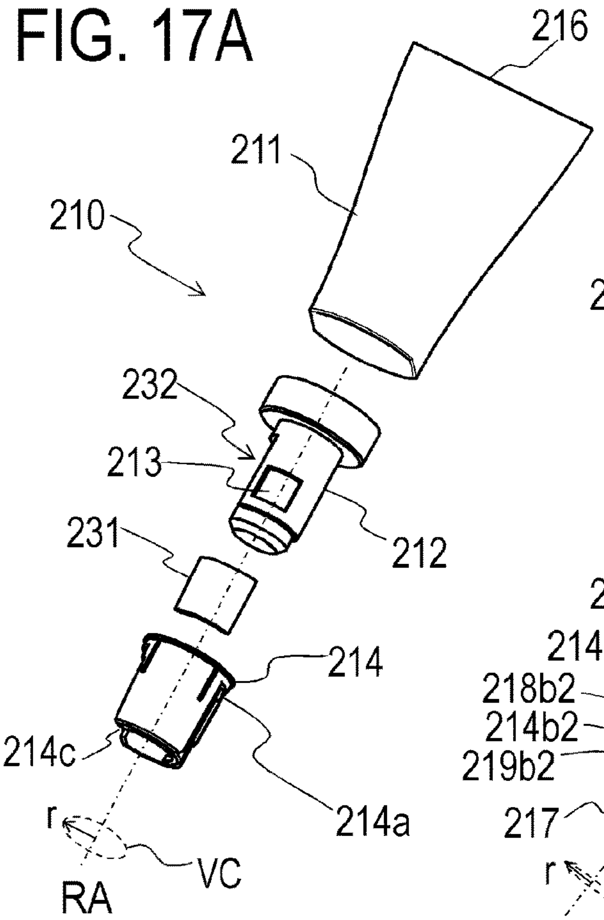
FIGS. 17A to 17C are exploded perspective views pf a replenishing pack.
Figure 17B:
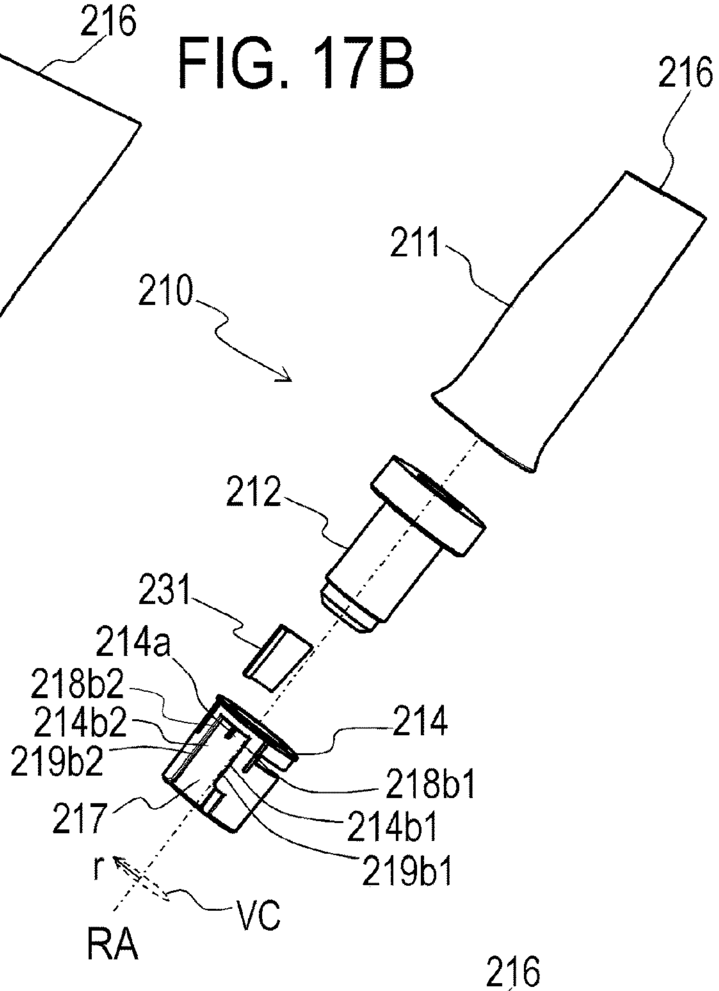
Figure 17C:
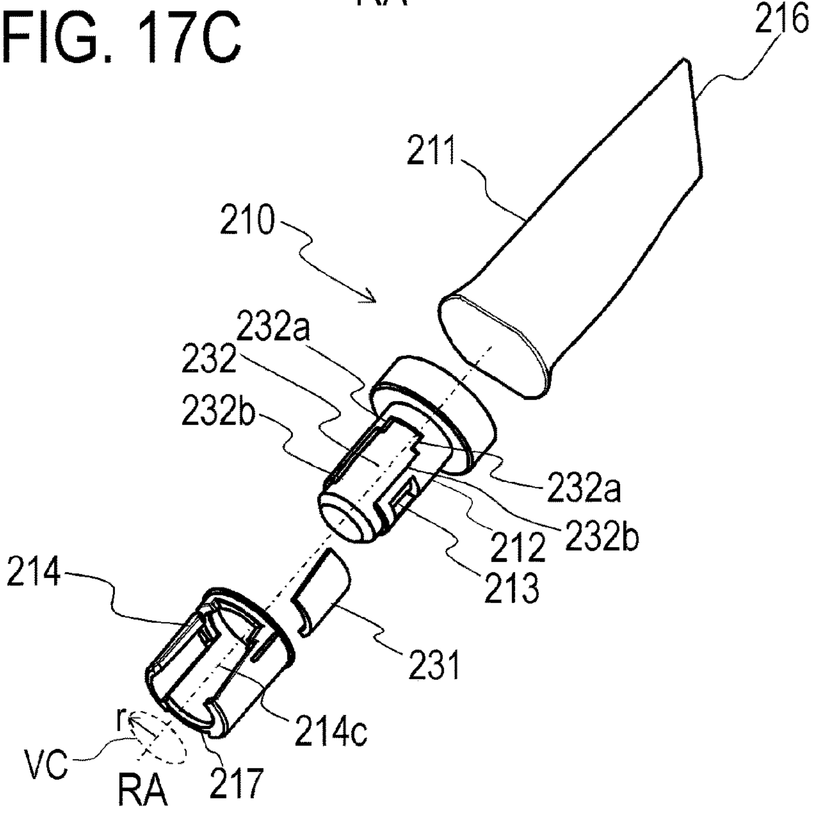

A configuration of the replenishing pack (developer container) used for the image forming apparatus or the developer replenishing system according to the present embodiment will be described in detail with reference to FIGS. 17A to 17C, 18A, and 18B. FIGS. 17A to 17C are exploded perspective views of the replenishing pack 210. FIGS. 17A to 17C are perspective views viewed from different directions. In the inserting portion 212, when the pack shutter portion 214 is at a close position, a pack shutter portion opening 214*c* provided in the pack shutter portion 214, and the guided portion 232 provided so as to be recessed from the outer peripheral surface of the inserting portion 212, overlap with each other in the rotation phase in the circumferential direction. In this state, the replenishing pack 210 is in a state where the guided portion 232 is engaged with and guided by the guiding portions 247 and 248, and the pack shutter portion opening 214*c* is engaged with the periphery of the sealing member 243 provided on the inner peripheral surface of the main body shutter portion 206. In the state where the replenishing pack 210 is attached to the attached portion 200, a first guided portion 232*a* (on the upstream side in the inserting direction) of the guided portion 232 engages with the guiding portion 247, and a second guided portion 232*b* (on the downstream side in the inserting direction) engages with the guiding portion 248. Further, a surface (step difference portion) extending in the circumferential direction between the first guided portion 232*a* and the second guided portion 232*b*, engages in the inserting direction with a surface (step difference portion) between the guiding portion 247 and the guiding portion 248, extending in the circumferential direction, and determines a position in the inserting direction between the inserting portion 212 and the mounting portion 201. The pack shutter portion opening 214*c* is a notch-shaped opening, of which width increases in a direction toward the front end of the inserting portion 212. A pair of facing portions, which form the pack shutter portion opening 214*c* and face each other in the circumferential direction, are provided on each side of the sealing member 243 in the circumferential direction.

As the shutter engaging portion, a driving transfer surface 214*b* of the pack shutter portion 214 engages with the mounting portion 201 (rotating member) in the pack shutter portion 214, and as the open/close engaging portion, the driving transfer surface 214*b* engages with the main body shutter portion 206 in the pack shutter portion 214. The pack shutter portion 214 is moved (rotated) together with the mounting portion 201 by the control (operation) force of the mounting portion 201, and transfers this control force to the main body shutter portion 206, so as to move the main body shutter portion 206 as well.

In other words, as the force-receiving region, the driving transfer surface 214*b* has a region that engages and contacts with the mounting portion driving transfer rib 201*d* (rotating member engaged portion). Specifically, as the shutter engaging portions, the driving transfer surface 214*b* includes: a first shutter engaging portion 218*b*1 that is a part of a first groove side surface 214*b*1 (first recessed portion side surface), out of the pair of groove side surfaces of the groove-shaped portion; and a second shutter engaging portion 218*b*2 that is a part of a second groove side surface 214*b*2 (second recessed portion side surface) thereof. On the other hand, as the rotating member engaged portion, the mounting portion driving transfer rib 201*d* includes: a first engaging portion 201*dl* (first rotating member engaged portion) that engages with the portion 218*b*1 of the driving transfer surface 214*b* in one circumferential direction around the rotation axial line; and a second engaging portion 201*d*2 (second rotating member engaged portion) that engages with the portion 218*b*2 of the driving transfer surface 214*b* in the other circumferential direction. Each engaging portion 201*dl* and 201*d*2 of the mounting portion driving transfer rib 201*d* has a protruded shape that extends from the inner peripheral surface of the annular mounting portion 201, centering the rotation axial line RA, toward the rotation axial line RA side.

Furthermore, at force applying regions (a pair of force applying portions), the driving transfer surfaces 214*b* include a region that engages and contacts with the main body shutter portion driving transfer rib 206*a* (open/close engaged portion). Specifically, as the open/close engaging portion, the driving transfer surfaces 214*b* include a portion (first open/close engaging portion) 219*b*1 provided at a position (downstream side in the inserting direction), which is different from the first shutter engaging portion 218*b*1 on the first groove side surface in the rotation axial line RA direction, and a portion (second open/close engaging portion) 219*b*2 provided at a position (downstream side in the inserting direction) which is different from the second shutter engaging portion 218*b*2 of the second groove side surface in the rotation axial line RA direction. On the other hand, as the open/close engaged portion, the main body shutter portion driving transfer rib 206*a* includes a first shutter protruded portion side surface **206*al* which is a portion (first open/close engaged portion) that engages with the portion 219*b*1 of the driving transfer surfaces 214*b* in one circumferential direction, and a second shutter protruded portion side surface 206*b*2 which is a portion (second open/close engaged portion) that engages with the portion 219*b*2 of the driving transfer surfaces 214*b*** in the other circumferential direction.

Description of Lever Lock Mechanism (Rotation Control Mechanism)

Figure 24:
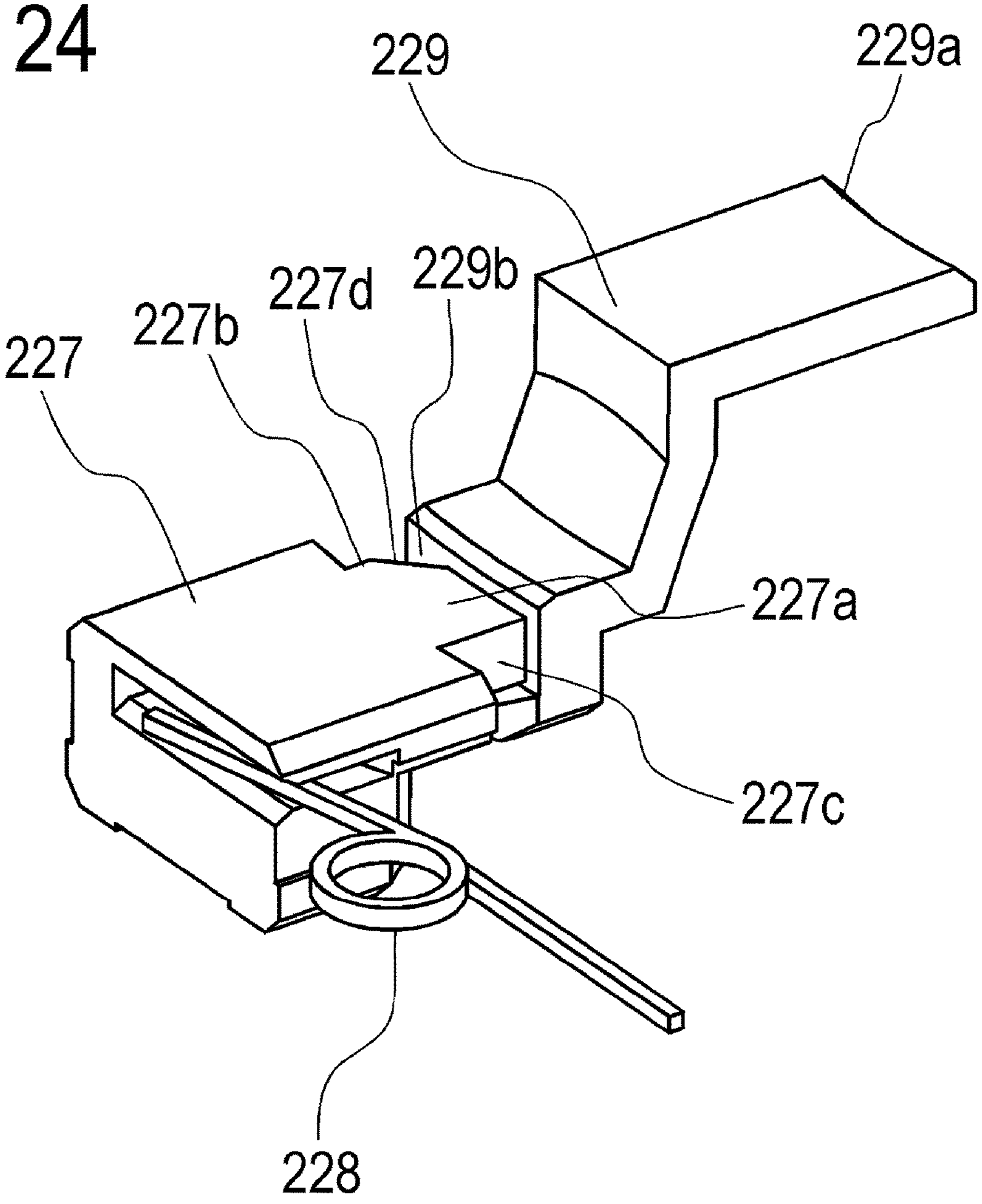
FIG. 24 is a perspective view of a rotation restricting mechanism.
Figure 25A:
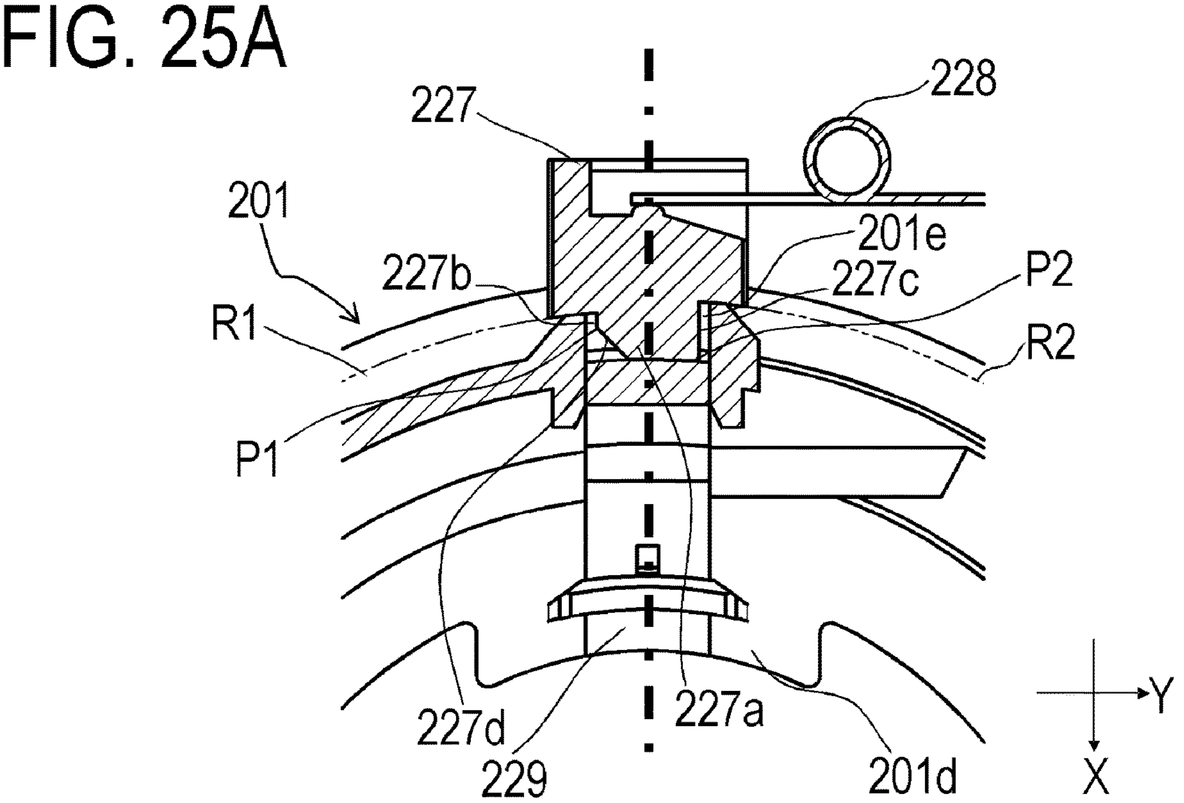
FIGS. 25A and 25B are cross-sectional views when a lever lock mechanism is locked.
Figure 25B:
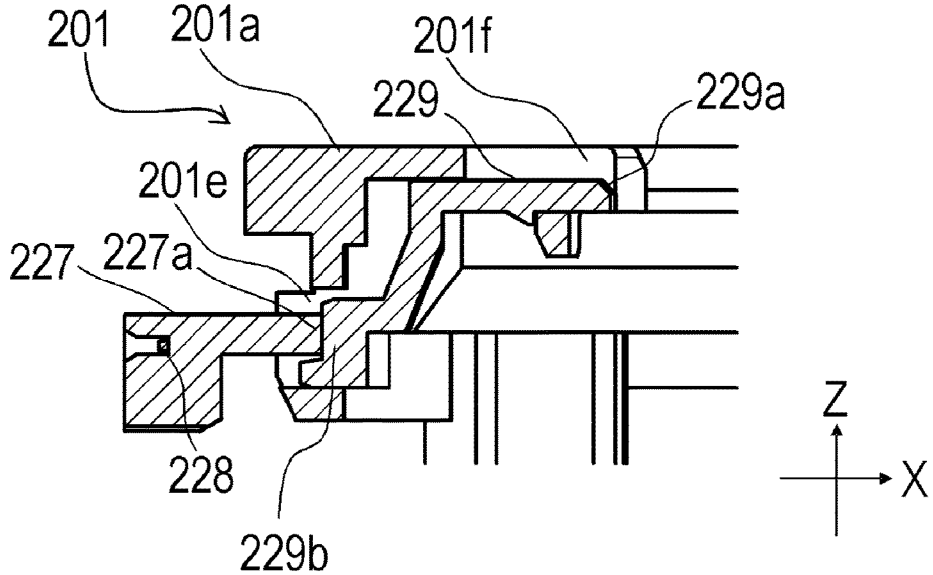
Figure 26A:
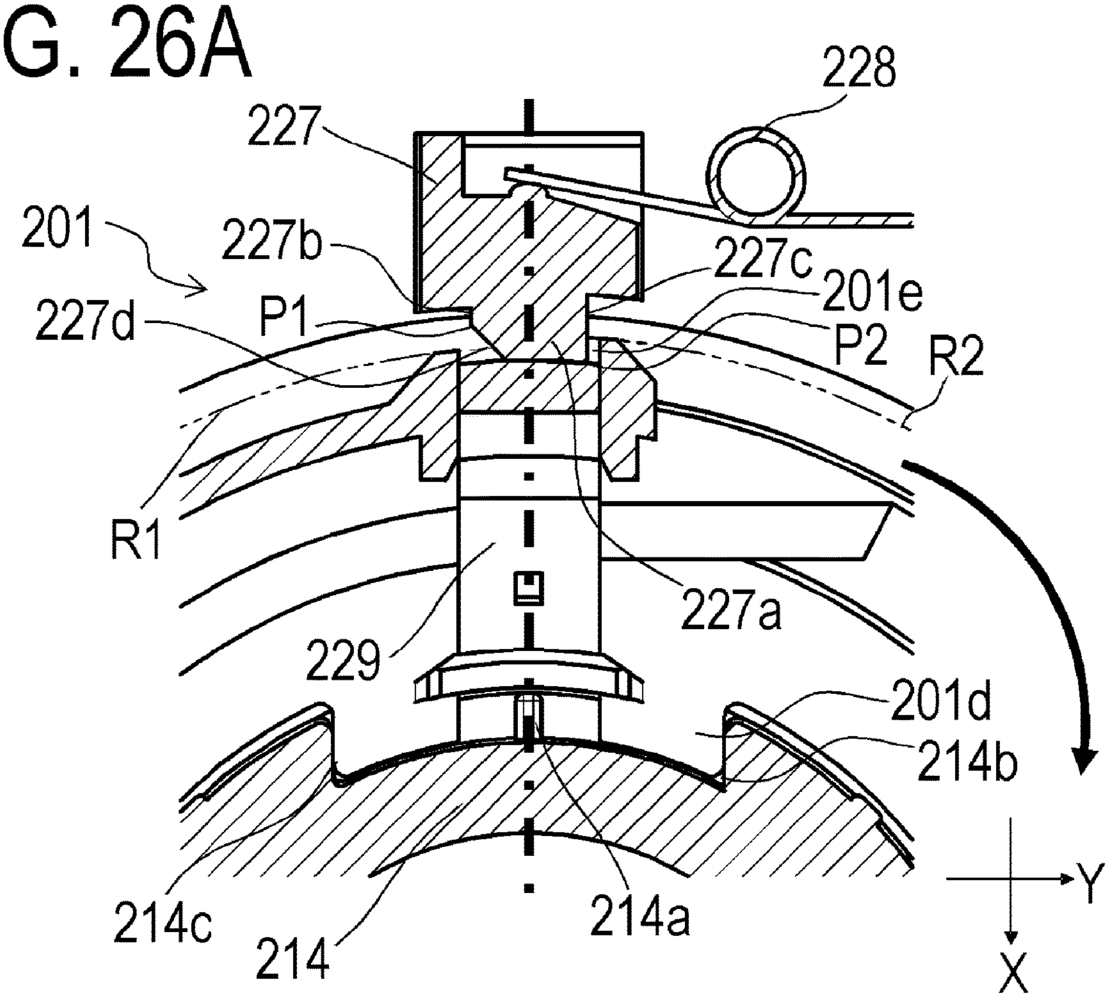
FIGS. 26A and 26B are cross-sectional views when the lock of the lever lock mechanism is released.
Figure 26B:
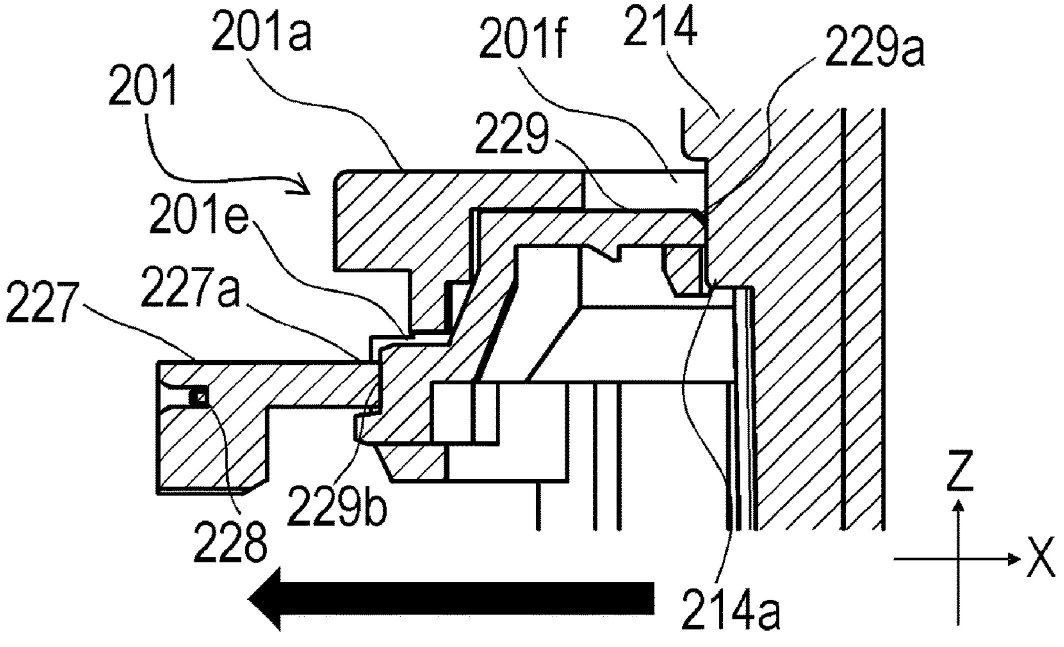

The lever lock mechanism will be described with reference to FIGS. 24, 25A, 25B, 26A, and 26B. The rotation direction of the mounting portion 201 is restricted by the lever lock mechanism, so as to be at the initial position when the replenishing pack 210 is not attached. FIG. 24 is a perspective view depicting the rotation restricting mechanism of the present embodiment, where only the lever lock member 227 (restricting member), the lever lock release link 229 (release member) and the lever lock portion pressing spring 228 (biasing member of the restricting return portion) are illustrated. FIGS. 25A and 25B are a bottom view and a cross-sectional view of the mounting portion 201 and the lever lock mechanism when the lever lock member 227 is at the restricting position (locked state). FIGS. 26A and 26B are a bottom view and a cross-sectional view of the mounting portion 201 and the lever lock mechanism when the lever lock member 227 is at an allowable position (lock released state).

As illustrated in FIGS. 25A and 25B, when the lever lock mechanism is activated, the lever lock member 227 is pressed to the mounting portion 201 by the lever lock portion pressing spring 228, and the lever lock pressing portion **227*a* is inserted into the opening 201*e* of the mounting portion 201. If the mounting portion 201 is rotated in this state, the inner wall of the opening 201*e* rotates along the rotation loci R1 and R2, as illustrated in FIG. 25A. P1 indicates a switching portion where a rotation restricting surface 227*b* changes an inclined surface 227*d*, and P2 indicates a switching portion at a rotation restricting surface 227*c*. When the lever lock mechanism is activated, P1 and P2 are located at the inside of the rotation loci R1 and R2. Therefore the inner wall of the opening 201*e* (restricted portion) contacts and engages with the rotation restricting surfaces 227*b* and 227*c* (restricting portions) which are surfaces perpendicular to the rotating direction, whereby rotation of the mounting portion 201** is restricted.

As illustrated in FIGS. 26A and 26B, when the replenishing pack 210 is attached, the lever lock release rib **214*a* passes through the lock release recessed portion 201*f* and contacts with the lever lock release link 229. The lever lock release link 229 has an inclined surface shape 229*a* that contacts with the lever lock release rib 214*a* and functions as a contact activating portion. The lever lock release link 229 receives a force to move the lever lock member 227 to a pressing position (a position that is moved to the lever lock release position) from the pack shutter portion 214 via the inclined surface shape 229*a* and the lever lock release rib 214*a*. The inclined surface shape 229*a* has a shape that is inclined toward the direction where the replenishing pack 210 is inserted into the mounting portion 201. In other words, the inclined surface shape 229*a* is a shape that is inclined so that the force received from the lever lock release rib 214*a* includes the component force that acts in the direction of moving the lever lock release link 229** to the pressing position.

As illustrated in FIG. 26B, the lever lock release link 229 is pressed in the arrow direction by the force that the inclined surface shape **229*a* (pressed portion) receives from the lever lock release rib 214*a*, and the edge, where the inclined surface shape 229*a* is formed, rises over the side surface of the lever lock release rib 214*a*. Thereby the lever lock release link 229 moves to the pressing position where the contact surface 229*b* (pressing portion) moves the lever lock member 227 to the lever lock release position. Then the lever lock member 227, which is in contact with the lever lock release link 229, moves to the lever lock release position in the arrow direction against the biasing force of the lever lock portion pressing spring 228**.

As illustrated in FIG. 26A, at the lever lock release position, P1 moves to the outside of the rotation locus R1, and P2 is maintained at the inside of R2. Therefore when the lever portion **201*b* is rotated in the arrow direction, the inclined surface 227*d* contacts with the inner wall of the opening 201*e*, and the lever lock member 227 is retracted by the component force, and the inclined surface 227*d* rises over the inner wall of the opening 201*e*. Therefore the lever lock member 227 allows rotation of the lever portion 201*b* in the arrow direction, and the lever portion 201*b*** can be rotated to the replenishing position.

The rotation in the opposite direction is continuously restricted since P2 is maintained at the inside of R2. In the present embodiment, the assembling phase of the mounting portion 201 is set to the direction in which rotation is restricted, whereby both the prevention of the rotation to the assembling phase direction after assembly and the rotation up to the replenishing position are implemented.

Figure 27A:
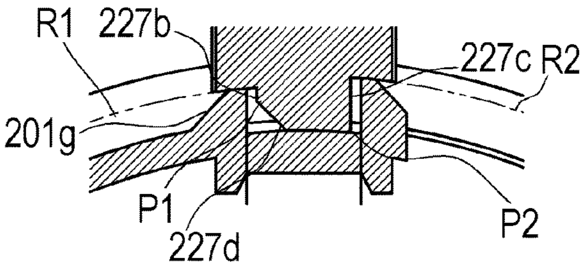
FIGS. 27A to 27E are cross-sectional views for describing a sequence of flow of the lever lock mechanism.
Figure 27B:
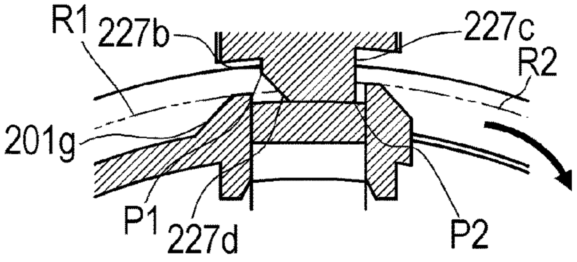
Figure 27C:
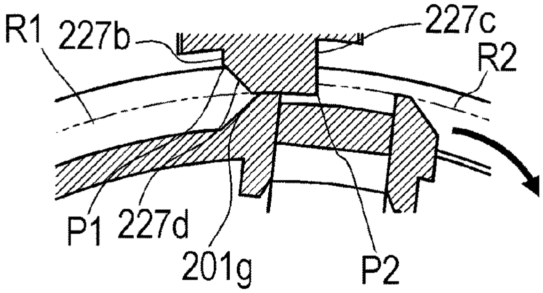
Figure 27D:
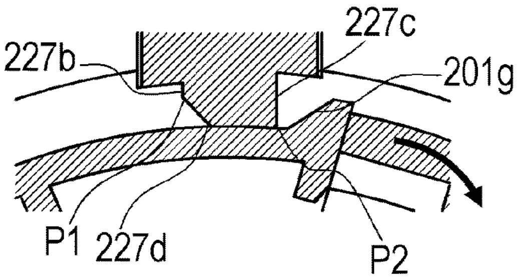
Figure 27E:
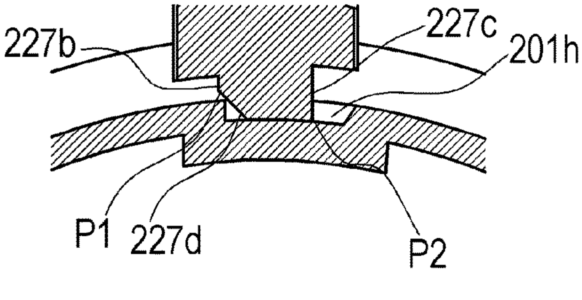

FIGS. 27A to 27E indicate a flow from the initial position of the lock mechanism to the replenishing position. In the initial position illustrated in FIG. 27A, P1 and P2 are on the inside of the rotation loci R1 and R2, and the rotation of the mounting portion 201 is restricted thereby, as described above. As illustrated in FIG. 27B, when the replenishing pack 210 is attached, the lever lock member 227 is retracted, and the mounting portion 201 can be rotated in the arrow direction, as described above. FIG. 27C indicates the state where the lock member 227 is retracted, and the inclined surface **227*d* completely rises over the opening 201*e*. From this state to the replenishing position, the lock member 227 and the lever lock release link 229 are in relative positions, and do not contact with each other (separated state), as illustrated in FIG. 27D, and the lock member 227 contacts with the outer surface of the mounting portion 201, and is maintained in the rotation allowable position. Since the lock member 227 does not interfere with the rotation of the mounting portion 201 in this state, the user can move the lever portion 201*b* to the replenishing position. If the mounting portion 201 is rotated to the replenishing position, as illustrated in FIG. 27E, the lever lock pressing portion 227*a* enters the replenishing position recessed portion 201*h* of the mounting portion 201, where an audible sound or operation force changes. Thereby, the user can easily recognize that the lever portion 201*b*** has been move to the replenishing position.

Replenishing Container Mounting Procedure

Figure 28A:
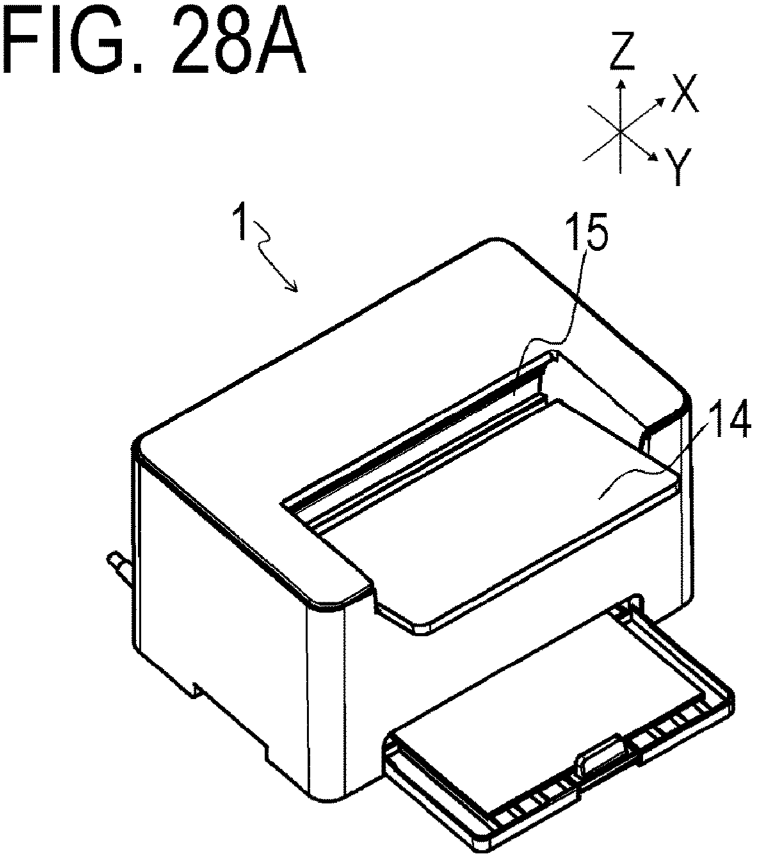
FIGS. 28A and 28B are perspective views depicting a state when a discharge tray is opened/closed.
Figure 28B:
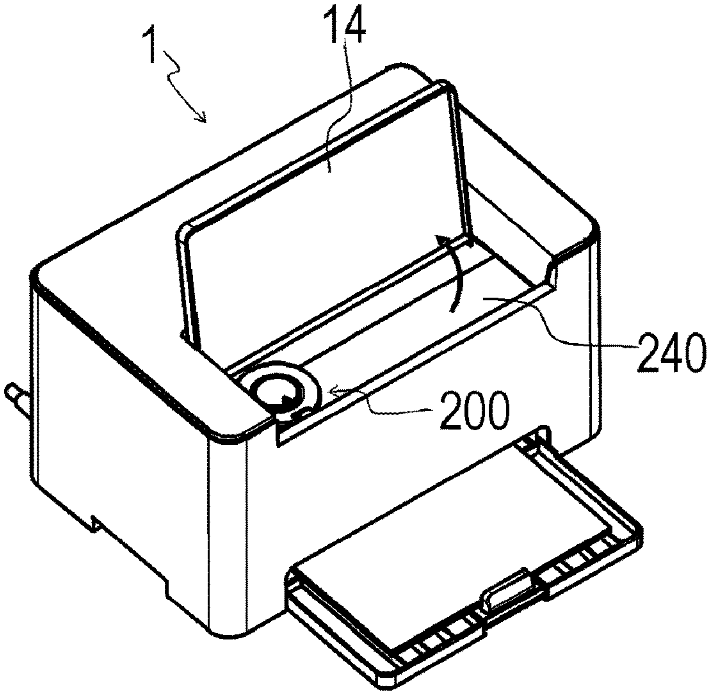

The procedure of replenishing toner using the replenishing pack 210 will be described with reference to FIGS. 28A, 28B, 29A, and 29B. FIGS. 28A and 28B are perspective views of the image forming apparatus 1. FIG. 28A indicates a state in which the discharge tray 14 covers the attached portion 200, and is at a position where the recording material P, discharged from the discharge outlet 15, can be loaded. FIG. 28B indicates a state in which the discharge tray 14 is at a position where the attached portion 200 is exposed from the discharge tray 14. The discharge tray 14 is configured to be movable to the position where the recording material P can be loaded, as indicated in FIG. 28A, and the position where the attached portion 200 is exposed, as indicated in FIG. 28B. The attached portion 200 is provided at an upper part of the front surface of the image forming apparatus 1, hence the user has easy access to the portion when toner is replenished.

When the toner is replenished, the recording material P, loaded on the discharge tray 14, is removed, and the discharge tray 14 at the loadable position indicated in FIG. 28A, is opened to be moved to the expose position indicated in FIG. 28B. When the discharge tray 14 is opened, the attached portion 200 and a top surface portion 240, which adjoins the attached portion 200, is exposed. Then the replenishing pack 210 is inserted into the exposed attached portion 200. At this time, the replenishing pack 210 is inserted such that the position of the mounting portion driving transfer rib 201*d* (FIG. 19B), which is provided in the attached portion 200, matches with the position of the positioning portion 217 (FIG. 18B) provided in the replenishing pack 210. If the positions of the mounting portion driving transfer rib 201*d* and the positioning portion 217 do not match, the replenishing pack 210 interferes with the mounting portion driving transfer rib 201*d*, and the replenishing pack 210 cannot be attached.

Here, if the colors of the mounting portion 201 and the lever lock release link 229 are different, then the phases of the replenishing pack 210 and the mounting portion 201 can, in a visual sense, be easily matched when the replenishing pack 210 is attached.

Figure 29A:
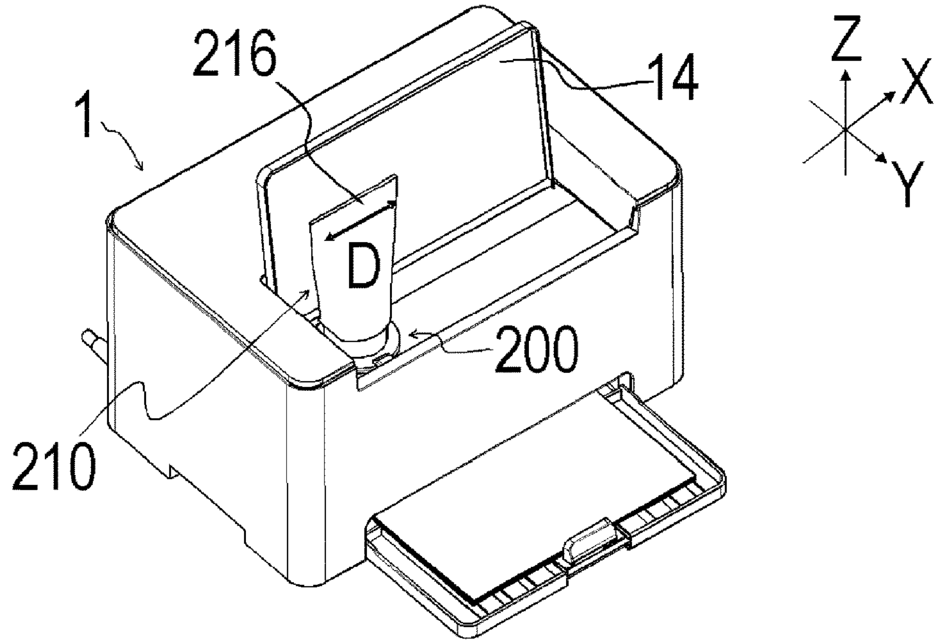
FIGS. 29A and 29B are perspective views depicting a state when the replenishing pack is attached.

FIG. 29A indicates a state where the replenishing pack 210 is inserted into the attached portion 200. As illustrated in FIG. 29A, in the present embodiment, the replenishing pack 210 can be inserted when the direction D, in which the pouch edge 216 extends, is parallel with the X direction. When the replenishing pack 210 is inserted into the base of the attached portion 200, the main body shutter portion driving transfer rib 206*a* (FIG. 14) of the attached portion 200 engages with the positioning portion 217 (FIGS. 18A and 18B) of the pack shutter portion 214 of the replenishing pack 210. In other words, the rib 206*a* faces the positioning portion 217 in the radius direction, and is inserted between the driving transfer surfaces 214*b*, whereby the main body shutter portion 206 and the pack shutter portion 214 are engaged and integrated. As a result, the main body shutter portion 206 and the pack shutter portion 214 can be rotated in tandem by the operation of the lever portion 201*b*.

Figure 29B:
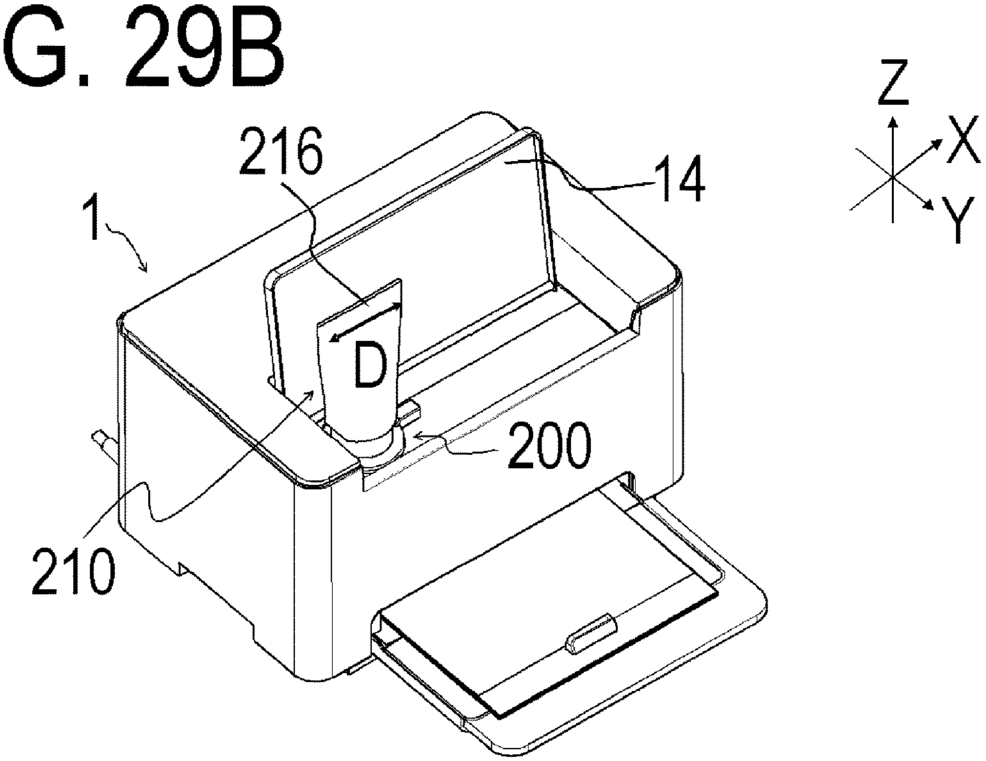

FIG. 29B indicates a state where the lever portion 201*b* is moved from the initial position to the replenishing position. At this time, the replenishing pack 210 in the Z direction is fixed to the attached portion 200 by a replenishing pack retaining mechanism (not illustrated). Then, as mentioned above, the pack shutter portion 214, provided in the replenishing pack 210, is rotated by moving the lever portion 201*b*. Further, the main body shutter portion 206 of the attached portion 200 is rotated with the pack shutter portion 214 since the main body shutter portion 206 and the pack shutter portion 214 are engaged. As a result, when the lever portion 201*b* is moved to the replenishing position, the side surface opening 205 (FIGS. 15A to 15C), which is formed in the toner-receiving portion 202, opens, and at the same time, the opening 213 (FIGS. 18A and 18B), which is formed in the inserting portion 212, opens. The side surface opening 205 formed in the toner-receiving portion 202 and the opening 213 formed in the inserting portion 212 are in such a positional relationship that the side surface opening 205 and the opening 213 face each other at the point when the replenishing pack 210 is inserted into the attached portion 200. Therefore when the lever portion 201*b* is moved from the initial position to the replenishing position, the replenishing pack 210, the attached portion 200 and the container portion 18 are connected, and the toner can be replenished.

Figure 30:
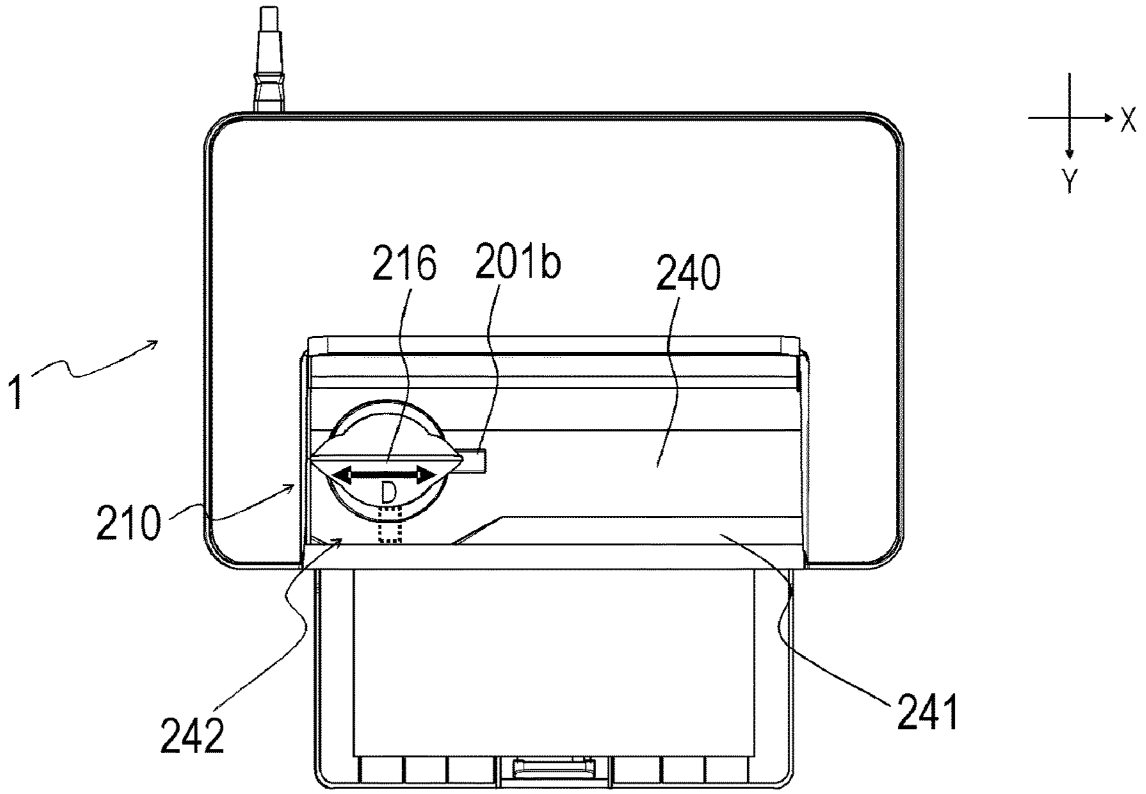
FIG. 30 is a top view depicting a state where the replenishing pack is attached.

FIG. 30 indicates a top view when the state in FIG. 29B is viewed from the top. In the replenishing pack 210 attached to the image forming apparatus 1 illustrated here, the direction D extending from the pouch edge 216 is parallel with the X direction, as mentioned above. At the edge on the plus side of the Y direction (front surface side) of the top surface portion 240 which is exposed when the discharge tray 14 is opened, a protruded portion 241, which protrudes in the plus side of the Z direction (upper side), is formed. The notch 242 is formed in a part of the protruded portion 241, and the position where the notch 242 is formed corresponds to the rotation locus of the lever portion 201*b*.

In FIG. 30, the lever portion 201*b* at the initial position is indicated by a dotted line. After the toner replenishment completes, the lever portion 201*b* is returned to the original position (initial position). At this time, in reverse sequence of the lever operation to the replenishing position, both the main body shutter portion 206 of the attached portion 200 and the pack shutter portion 214 of the replenishing pack 210 rotate first, then both the side surface opening 205 and the opening 213 thereof close respectively. Then the retention of the attached portion 200 and the replenishing pack 210 is released, and the replenishing pack 210 can be detached from the attached portion 200. Thereby the pack shutter portion 214 is in the closed state unless the replenishing pack 210 is inserted into the attached portion 200 of the image forming apparatus 1, and leaking of toner can be prevented.

Embodiment 2

In the configuration of using the replenishing pack 210, the user attaches the replenishing pack 210, and replenishes the toner to the image forming apparatus 1. Therefore if the user attaches a replenishing pack 210 filled with incompatible toner in error, image problems may occur. In Embodiment 1, the lock release recessed portion 201*f* of the mounting portion 201 used for the lever lock mechanism, is formed to be larger compared with the lock release rib 214*a* of the replenishing pack 210, and the lever lock mechanism can be released even if the positions of the lock release recessed portion 201*f* and the lock release rib 214*a* deviate somewhat. Therefore in Embodiment 2, as illustrated in FIGS. 31A and 31B, the positional relationship of the lock release recessed portion 201*f* and the lock release rib 214*a* is designed such that only a compatible combination is allowed, so that an attachment error by the user can be prevented.

Figure 31A:
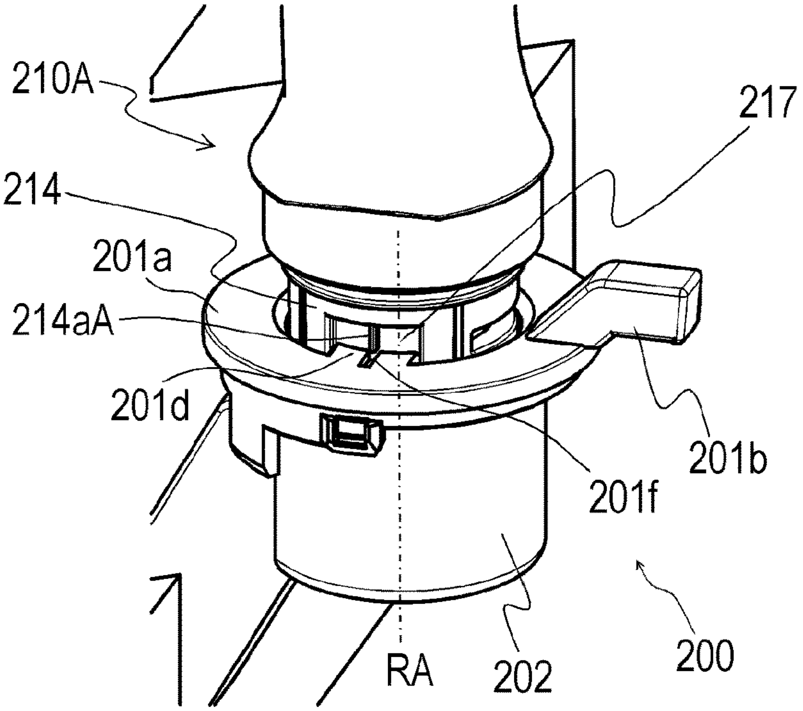
FIGS. 31A and 31B are perspective views of the replenishing portion and the developer container of which lever lock positions are different.
Figure 31B:
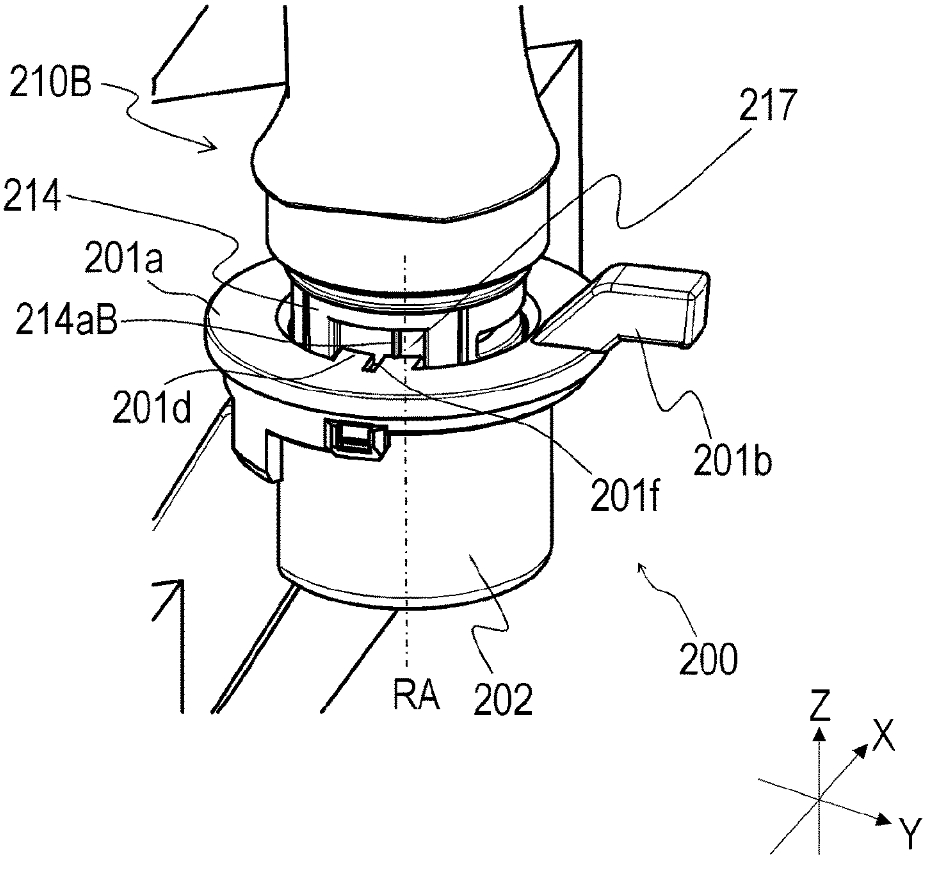

FIG. 31A indicates a first replenishing pack 210A with which the lock release recessed portion 201*f* and the lock release rib 214*a* do not interfere with each other. In other words, the first replenishing pack 210A is at such a relative position that various guide portions of the first replenishing pack 210A can be engaged with the attached portion 200, and a lock release rib 214*a*A can be guided by a lock release recessed portion 201*f* (guide portion). FIG. 31B, on the other hand, indicates a second replenishing pack 201B with which a lock release rib 214*a*B is provided at a position that is different from the lock release rib 214*a*A. The engaging positions of various guide portions of the second replenishing pack 210B are the same as the first replenishing pack 201A, but the position of the lock release rib 214*a*B is at a position where engaging with the lock release recessed portion 201*f* is not allowed, hence the second replenishing pack 210B contacts with the mounting portion driving transfer rib 201*d*, which is adjacent to the lock release recessed portion 201*f*, and forms a wall portion (attachment restricting portion). Thereby the second replenishing pack 210B is restricted not to be attached to the attached portion 200. The phases of the replenishing container 210 and the mounting portion 201, when the replenishing pack 210 is attached, are determined by the engagement of the positioning portion 217 and the mounting portion driving transfer rib 201*d*, hence if the position of the lock release rib 214*a* is different, the lock release rib 214*a* interferes with the mounting portion driving transfer rib 201*d*, whereby the replenishing pack 210 cannot be completely attached. Therefore by disposing a lock release rib 214*a* at a different position in the replenishing pack 210 filled with incompatible toner, an attachment error by the user can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-218436, filed on Dec. 28, 2020, which is hereby incorporated by reference herein in its entirety.

What is claimed is:

1. An image forming apparatus to which a developer container is attachable, the developer container provided with a discharge port and a container shutter configured to move for opening/closing the discharge port, the image forming apparatus comprising:

(i) a developer accommodating portion; and (ii) an attached portion to which the developer container is to be attached in an attaching direction and provided with a receiving port through which the developer accommodating portion is to receive developer from the developer container, the attached portion including, (ii-i) an operation member configured to move and configured to be operated by a user to move the container shutter, the operation member having an engaging portion configured to engage with the container shutter in a case where the developer container is attached to the attached portion;

(ii-ii) a restriction member configured to move, in a direction intersecting with the attaching direction, between a restricting position in which the restriction member restricts movement of the operation member by engaging with the operation member and an allowable position in which the restriction member allows the movement of the operation member, the restriction member being in the restricting position in a case where the developer container is not attached to the attached portion, wherein the restriction member is configured to move from the restricting position to the allowable position by an attachment of the developer container to the attached portion, and (ii-iii) a biasing member that biases the restriction member in a direction in which the restriction member is moved from the allowable position to the restricting position.

2. The image forming apparatus according to claim 1, wherein the attached portion further includes:

a release member that releases restriction of the movement of the operation member, the release member including a pressed portion and a pressing portion to press the restriction member in a direction in which the restriction member is moved from the restricting position to the allowable position;

wherein the release member is moved by the pressed portion being pressed by the developer container in the case where the developer container is attached to the attached portion, so that the pressing portion of the release member presses the restriction member to move the restriction member from the restricting position to the allowable position against a biasing force of the biasing member.

3. The image forming apparatus according to claim 2, wherein the release member is movably supported by the operation member so as to move together with the operation member, and wherein the attached portion includes a frame by which the restriction member is movably supported and to which the biasing member is attached.

4. The image forming apparatus according to claim 1, wherein when the restriction member is in the restricting position, the restriction member restricts the operation member from being moved from a first position to a second position, and when the restriction member is in the allowable position, the restriction member allows the operation member to be moved between the first position and the second position, and wherein in a state that the developer container is attached to the attached portion and the operation member is in the first position, the developer accommodating portion is not capable of receiving the developer from the developer container, and in a state that the developer container is attached to the attached portion and the operation member is in the second position, the developer accommodating portion is capable of receiving the developer from the developer container.

5. The image forming apparatus according to claim 4, wherein the attached portion includes an apparatus shutter which is provided with an apparatus shutter opening and a shutter engaging portion configured to engage with the container shutter and which is configured to move between a communication position where the apparatus shutter opening is communicated with the receiving port and a non-communication position where the apparatus shutter opening is not communicated with the receiving port, wherein the operation member is configured to move, through the container shutter, the apparatus shutter between the communication position and the non-communication position in a case where the developer container is attached to the attached portion, and wherein when the operation member is in the first position, the apparatus shutter is in the non-communication position, and when the operation member is in the second position, the apparatus shutter is in the communication position.

6. An image forming apparatus to which a developer container is attachable, the image forming apparatus comprising:

(i) a developer accommodating portion; and (ii) an attached portion to which the developer container is to be attached in an attaching direction and provided with a receiving port through which the developer accommodating portion is to receive developer from the developer container, the attached portion including, (ii-i) an apparatus shutter which is provided with an opening and which is configured to move between a communication position where the opening is communicated with the receiving port and a non-communication position where the opening is not communicated with the receiving port, (ii-ii) an operation member configured to move and configured to be operated by a user for movement of the apparatus shutter between the communication position and the non-communication position;

(ii-iii) a restriction member movable, in a direction intersecting with the attaching direction, between a restricting position in which the restriction member restricts movement of the operation member by engaging with the operation member and an allowable position in which the restriction member allows the movement of the operation member for moving the apparatus shutter between the communication position and the non-communication position, the restriction member being in the restricting position in a case where the developer container is not attached to the attached portion, the restriction member being configured to move from the restricting position to the allowable position by an attachment of the developer container to the attached portion; and (ii-iv) a biasing member that biases the restriction member in a direction in which the restriction member is moved from the allowable position to the restricting position.

7. The image forming apparatus according to claim 6, wherein the attached portion further includes:

a release member that releases restriction of the movement of the operation member, the release member including a pressed portion, and a pressing portion to press the restriction member in a direction in which the restriction member is moved from the restricting position to the allowable position;

wherein the release member is moved by the pressed portion being pressed by the developer container in the case where the developer container is attached to the attached portion, so that the pressing portion of the release member presses the restriction member to move the restriction member from the restricting position to the allowable position against the biasing force of a biasing member.

8. The image forming apparatus according to claim 7, wherein the release member is movably supported by the operation member so as to move together with the operation member, and wherein the attached portion includes a frame by which the restriction member is movably supported and to which the biasing member is attached.

9. An image forming apparatus to which a developer container is attachable, the image forming apparatus comprising:

(i) a developer accommodating portion; and (ii) an attached portion to which the developer container is to be attached in an attaching direction and provided with a receiving port through which the developer accommodating portion is to receive developer from the developer container, the attached portion including, (ii-i) an apparatus shutter which is provided with an opening and which is configured to move between a communication position where the opening is communicated with the receiving port and a non-communication position where the opening is not communicated with the receiving port, (ii-ii) a restriction member movable, in a direction intersecting with the attaching direction, between a restricting position in which the restriction member restricts movement of the apparatus shutter between the communication position and the non-communication position and an allowable position in which the restriction member allows the movement of the apparatus shutter, the restriction member being in the restricting position in a case where the developer container is not attached to the attached portion, the restriction member being configured to move from the restricting position to the allowable position by an attachment of the developer container to the attached portion, and (ii-iii) a biasing member that biases the restriction member in a direction in which the restriction member is moved from the allowable position to the restricting position.

* * * * *